(12) United States Patent
Park et al.

(10) Patent No.: US 12,126,007 B2
(45) Date of Patent: *Oct. 22, 2024

(54) SILICON PARTICLES FOR BATTERY ELECTRODES

(71) Applicant: Enevate Corporation, Irvine, CA (US)

(72) Inventors: Benjamin Yong Park, Mission Viejo, CA (US); Alexander Gorkovenko, Mission Viejo, CA (US); Rabih Bachir Zaouk, Los Angeles, CA (US); William Hubert Schank, Howell, MI (US); Genis Turon Teixidor, Upland, CA (US); Lothar Steffens, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/540,399

(22) Filed: Dec. 2, 2021

(65) Prior Publication Data

US 2022/0093909 A1 Mar. 24, 2022

Related U.S. Application Data

(63) Continuation of application No. 16/821,072, filed on Mar. 17, 2020, now Pat. No. 11,196,037, which is a
(Continued)

(51) Int. Cl.
H01M 4/134 (2010.01)
B28B 3/02 (2006.01)
(Continued)

(52) U.S. Cl.
CPC ............. H01M 4/134 (2013.01); B28B 3/025 (2013.01); B29C 48/08 (2019.02); B29C 48/154 (2019.02);
(Continued)

(58) Field of Classification Search
CPC ....... H01M 4/134; B29C 48/91; C04B 35/524
See application file for complete search history.

(56) References Cited

U.S. PATENT DOCUMENTS

| | | | |
|---|---|---|---|
| 3,990,098 | A | 11/1976 | Mastrangelo |
| 4,435,444 | A | 3/1984 | Goldberger et al. |
| 4,526,610 | A | 7/1985 | Miura et al. |
| 5,429,866 | A | 7/1995 | Dubrous |

(Continued)

FOREIGN PATENT DOCUMENTS

| | | |
|---|---|---|
| CN | 1667855 | 9/2005 |
| CN | 101095251 | 12/2007 |

(Continued)

OTHER PUBLICATIONS

Bogart et al., "High Capacity Lithium Ion Battery Anodes of Silicon and Germanium," Current Opinion in Chemical Engineering, 2013, vol. 2, pp. 1-8.

(Continued)

Primary Examiner — Khanh T Nguyen
(74) Attorney, Agent, or Firm — McAndrews, Held & Malloy, Ltd.

(57) ABSTRACT

Silicon particles for active materials and electro-chemical cells are provided. The active materials comprising silicon particles described herein can be utilized as an electrode material for a battery. In certain embodiments, the composite material includes greater than 0% and less than about 90% by weight of silicon particles. The silicon particles have an average particle size between about 0.1 μm and about 30 μm and a surface including nanometer-sized features. The composite material also includes greater than 0% and less than about 90% by weight of one or more types of carbon phases. At least one of the one or more types of carbon phases is a substantially continuous phase.

25 Claims, 26 Drawing Sheets

Related U.S. Application Data continuation of application No. 15/413,021, filed on Jan. 23, 2017, now Pat. No. 10,622,620, which is a continuation of application No. 13/799,405, filed on Mar. 13, 2013, now Pat. No. 9,553,303, which is a continuation-in-part of application No. 13/601,976, filed on Aug. 31, 2012, now abandoned, which is a continuation-in-part of application No. 13/008,800, filed on Jan. 18, 2011, now Pat. No. 9,178,208.

(60) Provisional application No. 61/530,881, filed on Sep. 2, 2011, provisional application No. 61/315,845, filed on Mar. 19, 2010, provisional application No. 61/295,993, filed on Jan. 18, 2010.

(51) Int. Cl.

| | |
|---|---|
| *B29C 48/08* | (2019.01) |
| *B29C 48/154* | (2019.01) |
| *B29C 48/88* | (2019.01) |
| *B29C 48/91* | (2019.01) |
| *C01B 32/00* | (2017.01) |
| *C01B 32/05* | (2017.01) |
| *C01B 33/02* | (2006.01) |
| *C01B 33/021* | (2006.01) |
| *C04B 35/515* | (2006.01) |
| *C04B 35/524* | (2006.01) |
| *C04B 35/626* | (2006.01) |
| *C04B 35/64* | (2006.01) |
| *C04B 35/645* | (2006.01) |
| *H01M 4/04* | (2006.01) |
| *H01M 4/133* | (2010.01) |
| *H01M 4/1393* | (2010.01) |
| *H01M 4/1395* | (2010.01) |
| *H01M 4/36* | (2006.01) |
| *H01M 4/38* | (2006.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC ............ *B29C 48/91* (2019.02); *B29C 48/914* (2019.02); *C01B 32/00* (2017.08); *C01B 32/05* (2017.08); *C01B 33/02* (2013.01); *C01B 33/021* (2013.01); *C04B 35/515* (2013.01); *C04B 35/524* (2013.01); *C04B 35/6264* (2013.01); *C04B 35/64* (2013.01); *C04B 35/645* (2013.01); *H01M 4/0409* (2013.01); *H01M 4/0411* (2013.01); *H01M 4/0416* (2013.01); *H01M 4/0433* (2013.01); *H01M 4/133* (2013.01); *H01M 4/1393* (2013.01); *H01M 4/1395* (2013.01); *H01M 4/364* (2013.01); *H01M 4/366* (2013.01); *H01M 4/386* (2013.01); *H01M 4/587* (2013.01); *H01M 4/625* (2013.01); *H01M 10/0525* (2013.01); *C01P 2004/61* (2013.01); *C01P 2004/62* (2013.01); *C01P 2006/40* (2013.01); *C01P 2006/80* (2013.01); *C04B 2235/3826* (2013.01); *C04B 2235/422* (2013.01); *C04B 2235/428* (2013.01); *C04B 2235/48* (2013.01); *C04B 2235/6025* (2013.01); *C04B 2235/606* (2013.01); *C04B 2235/85* (2013.01); *C04B 2235/87* (2013.01); *C04B 2235/96* (2013.01); *H01M 2004/021* (2013.01); *H01M 2004/027* (2013.01); *Y02P 70/50* (2015.11)

(56) References Cited

U.S. PATENT DOCUMENTS

| | | |
|---|---|---|
| 5,624,606 A | 4/1997 | Wilson et al. |
| 6,287,728 B1 * | 9/2001 | Kajiura ............... H01M 4/622 429/231.3 |
| 6,300,013 B1 | 10/2001 | Yamada et al. |
| 6,413,672 B1 | 7/2002 | Suzuki et al. |
| 6,432,579 B1 | 8/2002 | Tsuji et al. |
| 6,436,576 B1 | 8/2002 | Hossain |
| 6,489,061 B1 | 12/2002 | Hossain |
| 6,589,696 B2 | 7/2003 | Matsubara et al. |
| 6,743,549 B1 | 6/2004 | Doyle et al. |
| 6,770,399 B2 | 8/2004 | Umeno et al. |
| 6,946,223 B2 | 9/2005 | Kusumoto et al. |
| 6,949,314 B1 | 9/2005 | Hossain |
| 7,037,581 B2 | 5/2006 | Aramata et al. |
| 7,202,000 B2 | 4/2007 | Iriyama et al. |
| 7,303,838 B2 | 12/2007 | Morita et al. |
| 7,316,792 B2 | 1/2008 | Kosuzu et al. |
| 7,615,314 B2 | 11/2009 | Kawakami et al. |
| 7,670,970 B2 | 3/2010 | Ko |
| 8,158,285 B2 | 4/2012 | Im et al. |
| 8,288,039 B2 | 10/2012 | Im et al. |
| 8,372,549 B2 | 2/2013 | Im et al. |
| 8,603,683 B2 | 12/2013 | Park et al. |
| 8,709,653 B2 | 4/2014 | Lee et al. |
| 9,178,208 B2 | 11/2015 | Park et al. |
| 9,397,338 B2 | 7/2016 | Park et al. |
| 9,553,303 B2 | 1/2017 | Park et al. |
| 9,583,757 B2 | 2/2017 | Park et al. |
| 9,608,262 B2 | 3/2017 | Aramata et al. |
| 9,620,809 B2 | 4/2017 | Turon Teixidor et al. |
| 9,647,259 B2 | 5/2017 | Park et al. |
| 9,806,328 B2 | 10/2017 | Park et al. |
| 9,941,509 B2 | 4/2018 | Park et al. |
| 9,997,765 B2 | 6/2018 | Park |
| 10,103,378 B2 | 10/2018 | Park et al. |
| 10,622,620 B2 | 4/2020 | Park et al. |
| 2002/0009646 A1 | 1/2002 | Matsubara et al. |
| 2004/0137327 A1 | 7/2004 | Gross et al. |
| 2005/0014072 A1 | 1/2005 | Yamaguchi et al. |
| 2005/0031958 A1 | 2/2005 | Fukuoka et al. |
| 2005/0089755 A1 | 4/2005 | Matsubara |
| 2005/0233213 A1 | 10/2005 | Lee et al. |
| 2006/0003227 A1 | 1/2006 | Aramata |
| 2006/0035146 A1 | 2/2006 | Hayashi et al. |
| 2006/0035149 A1 | 2/2006 | Nanba |
| 2006/0040182 A1 | 2/2006 | Kawakami et al. |
| 2006/0051670 A1 | 3/2006 | Aramata et al. |
| 2006/0051675 A1 | 3/2006 | Musha et al. |
| 2006/0068287 A1 | 3/2006 | Morita et al. |
| 2006/0127773 A1 | 6/2006 | Kawakami et al. |
| 2006/0134516 A1 | 6/2006 | Im et al. |
| 2006/0147799 A1 | 7/2006 | Hayashi et al. |
| 2006/0147802 A1 | 7/2006 | Yasuda et al. |
| 2006/0275668 A1 | 12/2006 | Peres et al. |
| 2007/0054190 A1 | 3/2007 | Fukui et al. |
| 2007/0072074 A1 | 3/2007 | Yamamoto et al. |
| 2007/0072084 A1 | 3/2007 | Katsushi et al. |
| 2007/0077490 A1 | 4/2007 | Kim et al. |
| 2007/0154811 A1 | 7/2007 | Oh et al. |
| 2007/0212610 A1 | 9/2007 | Sonobe et al. |
| 2007/0243469 A1 | 10/2007 | Kim et al. |
| 2007/0281216 A1 | 12/2007 | Petrat et al. |
| 2008/0020282 A1 | 1/2008 | Kim et al. |
| 2008/0102370 A1 | 5/2008 | Kashiwagi |
| 2008/0145757 A1 | 6/2008 | Mah et al. |
| 2008/0145761 A1 | 6/2008 | Petrat et al. |
| 2008/0160409 A1 | 7/2008 | Ishida et al. |
| 2008/0280207 A1 | 11/2008 | Patoux et al. |
| 2008/0286657 A1 | 11/2008 | Hasegawa et al. |
| 2009/0004566 A1 | 1/2009 | Shirane et al. |
| 2009/0023065 A1 | 1/2009 | Hwang |
| 2009/0029256 A1 | 1/2009 | Mah et al. |
| 2009/0053589 A1 | 2/2009 | Obrovac et al. |
| 2009/0053608 A1 | 2/2009 | Choi et al. |
| 2009/0087743 A1 | 4/2009 | Kim et al. |

(56) References Cited

U.S. PATENT DOCUMENTS

| | | | |
|---|---|---|---|
| 2009/0117467 A1 | 5/2009 | Zhamu et al. | |
| 2009/0117468 A1 | 5/2009 | Eom | |
| 2009/0181304 A1 | 7/2009 | Miyamoto et al. | |
| 2009/0186267 A1 | 7/2009 | Tiegs | |
| 2009/0202911 A1 | 8/2009 | Fukuoka et al. | |
| 2009/0239151 A1 | 9/2009 | Nakanishi et al. | |
| 2009/0283875 A1 | 11/2009 | Garandet et al. | |
| 2009/0305135 A1 | 12/2009 | Shi et al. | |
| 2009/0317722 A1 | 12/2009 | Watanabe | |
| 2010/0078599 A1 | 4/2010 | Kumta et al. | |
| 2010/0143798 A1 | 6/2010 | Zhamu et al. | |
| 2010/0255376 A1 | 10/2010 | Park et al. | |
| 2010/0266902 A1 | 10/2010 | Takano et al. | |
| 2010/0273058 A1 | 10/2010 | Lee et al. | |
| 2011/0020701 A1 | 1/2011 | Park et al. | |
| 2011/0045360 A1 | 2/2011 | Deguchi | |
| 2011/0135558 A1 | 6/2011 | Ma et al. | |
| 2011/0177393 A1 | 7/2011 | Park et al. | |
| 2011/0244333 A1 | 10/2011 | Kawada | |
| 2012/0094178 A1 | 4/2012 | Loveridge et al. | |
| 2012/0202069 A1 | 8/2012 | Aoki | |
| 2012/0210823 A1 | 8/2012 | Lee et al. | |
| 2014/0147751 A1 | 5/2014 | Yang et al. | |
| 2014/0170482 A1* | 6/2014 | Park | H01M 4/13 156/60 |
| 2014/0170498 A1 | 6/2014 | Park | |
| 2015/0118567 A1 | 4/2015 | Chen | |
| 2015/0325848 A1 | 11/2015 | Yamashita et al. | |
| 2017/0040598 A1* | 2/2017 | Wang | H01M 4/134 |
| 2017/0133665 A1 | 5/2017 | Park | |
| 2017/0133670 A1 | 5/2017 | Park | |
| 2017/0155126 A1 | 6/2017 | Park | |
| 2017/0170510 A1 | 6/2017 | Turon Teixidor et al. | |
| 2017/0279093 A1 | 9/2017 | Park | |
| 2017/0365845 A1* | 12/2017 | Moon | H01M 4/136 |
| 2018/0062154 A1 | 3/2018 | Park et al. | |
| 2018/0198114 A1 | 7/2018 | Bonhomme et al. | |
| 2018/0219211 A1 | 8/2018 | Park et al. | |
| 2018/0226642 A1 | 8/2018 | Wang et al. | |
| 2018/0287129 A1 | 10/2018 | Park | |

FOREIGN PATENT DOCUMENTS

| | | | | |
|---|---|---|---|---|
| CN | 102834955 | | 12/2012 | |
| EP | 1 054 462 | | 11/2000 | |
| EP | 1 363 341 | | 11/2003 | |
| EP | 1 722 429 | | 11/2006 | |
| EP | 2 113 955 | | 11/2009 | |
| JP | 2000-173667 | | 6/2000 | |
| JP | 2000-272911 | | 10/2000 | |
| JP | 2001-006682 | | 1/2001 | |
| JP | 2001-160392 | | 6/2001 | |
| JP | 2001185123 A | * | 7/2001 | H01M 10/05 |
| JP | 2003-165715 | | 6/2003 | |
| JP | 2004-103405 | | 4/2004 | |
| JP | 2005-285382 | | 10/2005 | |
| JP | 2007-073334 | | 3/2007 | |
| JP | 2007-165061 | | 6/2007 | |
| JP | 2008-153006 | | 7/2008 | |
| JP | 2009-026760 | | 2/2009 | |
| KR | 2009-0109225 | | 10/2009 | |
| WO | 1998028804 | | 7/1998 | |
| WO | 2011088472 | | 7/2011 | |
| WO | 2012126338 | | 9/2012 | |
| WO | 2014007161 | | 1/2014 | |
| WO | 2014158729 | | 10/2014 | |
| WO | 2017027263 | | 2/2017 | |

OTHER PUBLICATIONS

Choi et al., "Effect of Fluoroethylene Carbonate Additive on Interfacial Properties of Silicon Thin-Film Electrode," Journal of Power Sources, 2006, vol. 161, pp. 1254-1259.

Choi et al., "Enhanced Electrochemical Properties of a Si-based Anode Using an Electrochemically Active Polyamide Imide Binder," Journal of Power Sources, 2008, vol. 177, pp. 590-594.

Datta, et al., "Silicon, Graphite and Resin Based Hard Carbon Nanocomposite Anodes for Lithium Ion Batteries," Journal of Power Sources, Feb. 10, 2007, vol. 165, No. 1, pp. 368-378.

Gilman et al., "Chapter 11 Thermal Decomposition Chemistry of Poly(vinyl alcohol)," in Fire and Polymers II: Materials and Test for Hazard Prevention, American Chemical Society, ACS Symposium Series 599, Aug. 21-26, 1994, Washington, DC, pp. 161-185.

Hsu, G., "Fines in Fluidized Bed Silane Pyrolysis," Journal of the Electrochemical Society, Mar. 1984, vol. 131, No. 3, pp. 660-663.

Hu et al., "Superior Storage Performance of a Si@SiOx/C Nanocomposite as Anode Material for Lithium-Ion Batteries," Angewandte Chemie International Edition, Feb. 15, 2008, vol. 47, No. 9, pp. 1645-1649.

Ji et al., "Electrospun Carbon Nanofibers Containing Silicon Particles as an Energy-Storage Medium," Carbon, Nov. 2009, vol. 47, No. 14, pp. 3219-3226.

Lee et al., "Graphene-Silicon Composite for Li-Ion Battery Anodes," http://apps.aiche.org/proceedings/Abstracts.aspx?PaperID=162914, dated Sep. 11, 2009 [Retrieved Jun. 23, 2011].

Lee et al., "Silicon Nanoparticles-Graphene Paper Composites for Li ion Battery Anodes," Chemical Communications, 2010, vol. 46, No. 12, pp. 2025-2027.

Lin et al., "High Performance Silicon Nanoparticle Anode in Fluoroethylene Carbonate-Based Electrolyte for Li-Ion Batteries," Chemical Communications, 2012, vol. 48, pp. 7268-7270.

Ma et al., "Si-Based Anode Materials for Li-Ion Batteries: A Mini Review," Nano-Micro Letters, 2014, vol. 6, No. 4, pp. 347-358.

Na et al., "Effect of the Average Particle Size and the Surface Oxidation Layer of Silicon on the Colloidal Silica Particle Through Direct Oxidation," Materials Science and Engineering B 163, 2009, pp. 82-87.

Nakai et al., "Investigation of the Solid Electrolyte Interphase Formed by Fluoroethylene Carbonate on Si Electrodes," Journal of the Electrochemical Society, 2011, vol. 158, No. 7, pp. A798-A801.

"Pitch-based carbon fiber," Wikipedia, https://en.wikipedia.org/wiki/Pitch-based_carbon_fiber, edited Nov. 7, 2017, 3 pages.

Seo et al., "Stacking Faults in β-SiC Formed During Carbothermal Reduction of SiO2," Journal of the American Ceramic Society, 1996, vol. 79, No. 7, pp. 1777-1782.

Studart et al., "Processing Routes to Macroporous Ceramics: A Review," Journal of the American Ceramic Society, Jun. 1, 2006, pp. 1771-1789.

Su et al., "Silicon-Based Nanomaterials for Lithium-Ion Batteries: A Review" Advanced Energy Materials, 2014, vol. 4, pp. 1-23.

Sun et al., "Formation of Silicon Carbide Nanotubes and Nanowires via Reaction of Silicon (from Disproportionation of Silicon Monoxide) with Carbon Nanotubes," Journal of the American Ceramic Society, 2002, vol. 124, No. 48, pp. 14464-14471.

Wolf, H. et al., "Carbon-Fiber-Silicon Nanocomposites for Lithium-Ion Battery Anodes by Microwave Plasma Chemical Vapor Deposition," Journal of Power Sources, May 1, 2009, vol. 190, No. 1, pp. 157-161.

Zhang et al., "Heterostructures of Single-Walled Carbon Nanotubes and Carbide Nanorods," Science, Sep. 10, 1999, vol. 285, pp. 1719-1722.

Zhang, Sheng Shui, "A Review on Electrolyte Additives for Lithium-Ion Batteries," Journal of Power Sources, 2006, vol. 162, pp. 1379-1394.

Zhang, Wei-Jun., "A Review of the Electrochemical Performance of Alloy Anodes for Lithium-Ion Batteries," Journal of Power Sources, 2011, vol. 196, pp. 13-24.

Zhou et al., "Kinetics Model for the Growth of Silicon Carbide by the Reaction of Liquid Silicon with Carbon," Journal of the American Ceramic Society, 1995, vol. 78, No. 9, pp. 2456-2462.

International Search Report and Written Opinion for International Application No. PCT/US2011/021585, dated Jul. 26, 2011, 5 pages.

International Search Report and Written Opinion for International Application No. PCT/US2011/021585, dated May 3, 2012, 8 pages.

(56) References Cited

OTHER PUBLICATIONS

International Preliminary Report on Patentability for International Application No. PCT/US2011/021585, dated Jun. 28, 2012, 14 pages.
International Search Report and Written Opinion for International Application No. PCT/US2014/019683, dated May 30, 2014, 13 pages.
International Preliminary Report on Patentability and Written Opinion for International Application No. PCT/US2014/019683, dated Sep. 15, 2015, 8 pages.
International Search Report and Written Opinion for International Application No. PCT/US2016/045184, dated Oct. 7, 2016, 11 pages.
International Preliminary Report on Patentability and Written Opinion for International Application No. PCT/US2016/045184, dated Feb. 22, 2018, 8 pages.
International Search Report and Written Opinion for International Application No. PCT/US2018/035486, dated Sep. 5, 2018, 18 pages.
Office Action for International Application No. PCT/US2018/035846, dated Nov. 20, 2019, 4 pages.
International Preliminary Report on Patentability for International Application No. PCT/US2018/035846, dated Jan. 22, 2020, 22 pages.

* cited by examiner

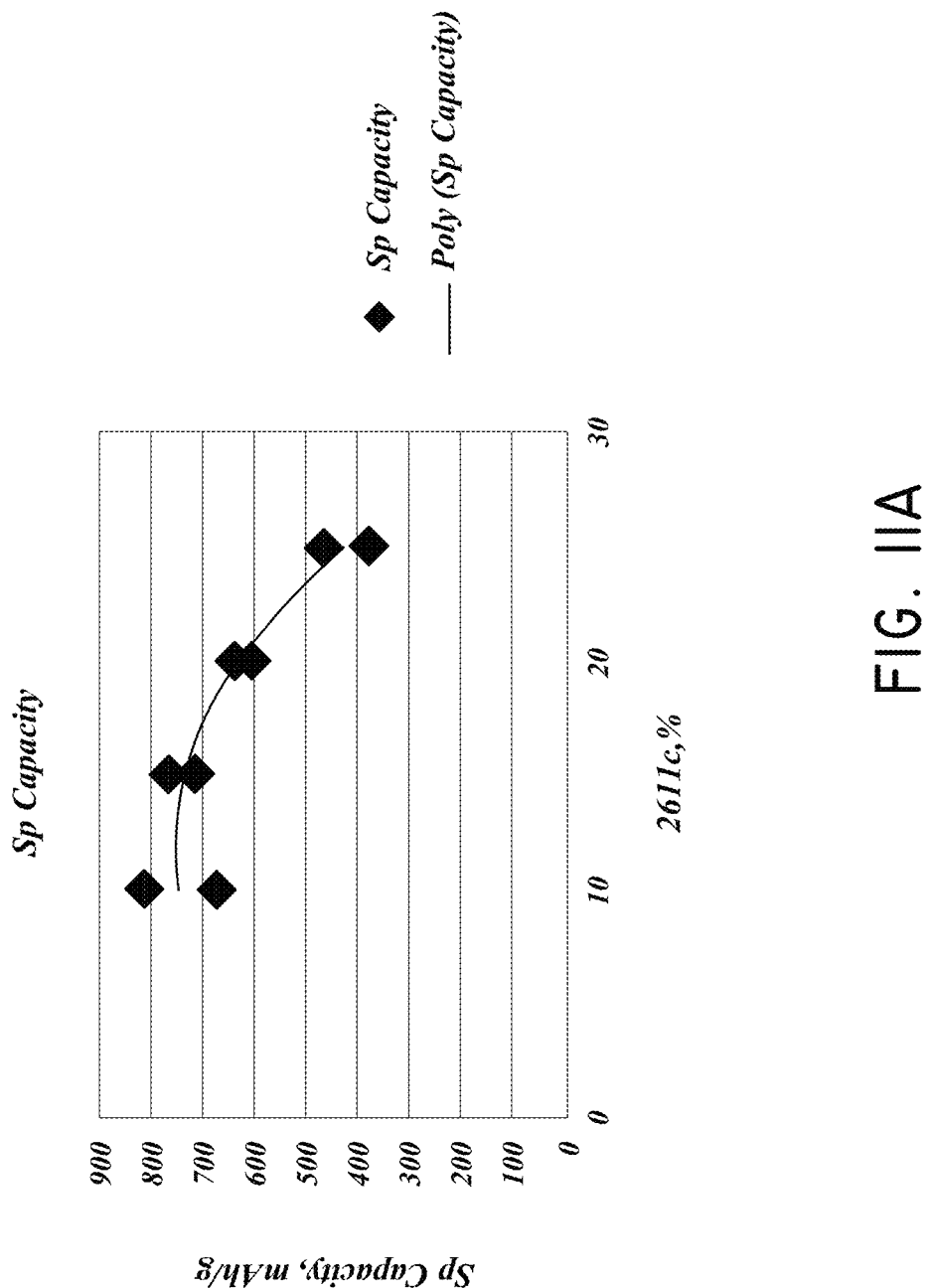
FIG. IIA

| Major | Si |
|---|---|
| Elements looked for but not detected (<0.001) | Ag |
| | Al |
| | B |
| | Be |
| | Bi |
| | Cd |
| | Co |
| | Cr |
| | Cu |
| | Fe |
| | Ge |
| | In |
| | Mg |
| | Mn |
| | Mo |
| | Nb |
| | Ni |
| | Pb |
| | Sb |
| | Sn |
| | Sr |
| | Ti |
| | V |
| | W |
| | Zn |
| | Zr |
| Elements looked for but not detected (<0.005) | As |
| | Ca |

FIG. 26

SILICON PARTICLES FOR BATTERY ELECTRODES

CROSS-REFERENCE TO RELATED APPLICATIONS

This application is a continuation of U.S. application Ser. No. 16/821,072, filed Mar. 17, 2020, which is a continuation of U.S. application Ser. No. 15/413,021, filed Jan. 23, 2017, which is a continuation of U.S. application Ser. No. 13/799, 405, filed Mar. 13, 2013, which is a continuation-in-part of U.S. application Ser. No. 13/601,976, filed Aug. 31, 2012, which claims the benefit of U.S. Provisional Application No. 61/530,881, filed Sep. 2, 2011 and is also a continuation-in-part of U.S. application Ser. No. 13/008,800, filed Jan. 18, 2011, which claims the benefit of U.S. Provisional Application No. 61/295,993, filed Jan. 18, 2010 and also claims the benefit of U.S. Provisional Application No. 61/315,845, filed Mar. 19, 2010, the disclosures of each of the above referenced applications are hereby incorporated by reference in their entirety.

BACKGROUND

Field

The present application relates generally to silicon particles. In particular, the present application relates to silicon particles and composite materials including silicon particles for use in battery electrodes.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

SUMMARY

One embodiment provides silicon particles for use in an electrode in an electro-chemical cell comprising an average particle size between about 10 nm and about 40 μm.

One embodiment provides an electrode for use in an electro-chemical cell comprising silicon particles, the silicon particles having an average particle size between about 10 nm and about 40 μm.

Another embodiment provides an electro-chemically active material comprising silicon particles, the silicon particles having an average particle size between about 10 nm and about 40 μm.

Another embodiment provides a composite material comprising: greater than 0% and less than about 90% by weight silicon particles, the silicon particles having an average particle size between about 10 nm and about 40 μm; and greater than 0% and less than about 90% by weight of one or more types of carbon phases, wherein at least one of the one or more types of carbon phases is a substantially continuous phase.

Another embodiment provides a composite material comprising: greater than 0% and less than about 90% by weight of silicon particles, the silicon particles having an average particle size between about 0.1 μm and about 30 μm and a surface comprising nanometer-sized features; and greater than 0% and less than about 90% by weight of one or more types of carbon phases, wherein at least one of the one or more types of carbon phases is a substantially continuous phase.

Another embodiment provides an electrode configured to be used in an electro-chemical cell. The electrode comprises an average particle size between about 0.1 μm and about 30 μm; and a surface comprising nanometer-sized features disposed thereon.

A further embodiment provides a method of forming a composite material. The method comprises providing a plurality of silicon particles having an average particle size between about 0.1 μm and about 30 μm and a surface comprising nanometer-sized features; forming a mixture comprising a precursor and the plurality of silicon particles; and pyrolysing the precursor to convert the precursor into one or more types of carbon phases to form the composite material. In some such embodiments, providing a plurality of silicon particles comprises providing silicon material; and synthesizing the silicon material to form the plurality of silicon particles comprising an average particle size between about 0.1 μm and about 30 μm and a surface comprising the nanometer-sized features.

BRIEF DESCRIPTION OF THE DRAWINGS

FIGS. 11A and 11B are plots of the reversible and irreversible capacity as a function of the various weight percentage of PI derived carbon from 2611c and graphite particles for a fixed percentage of 20 wt. % Si;

FIG. 26 is a chemical analysis of the sample silicon particles.

DETAILED DESCRIPTION

Figure 1:
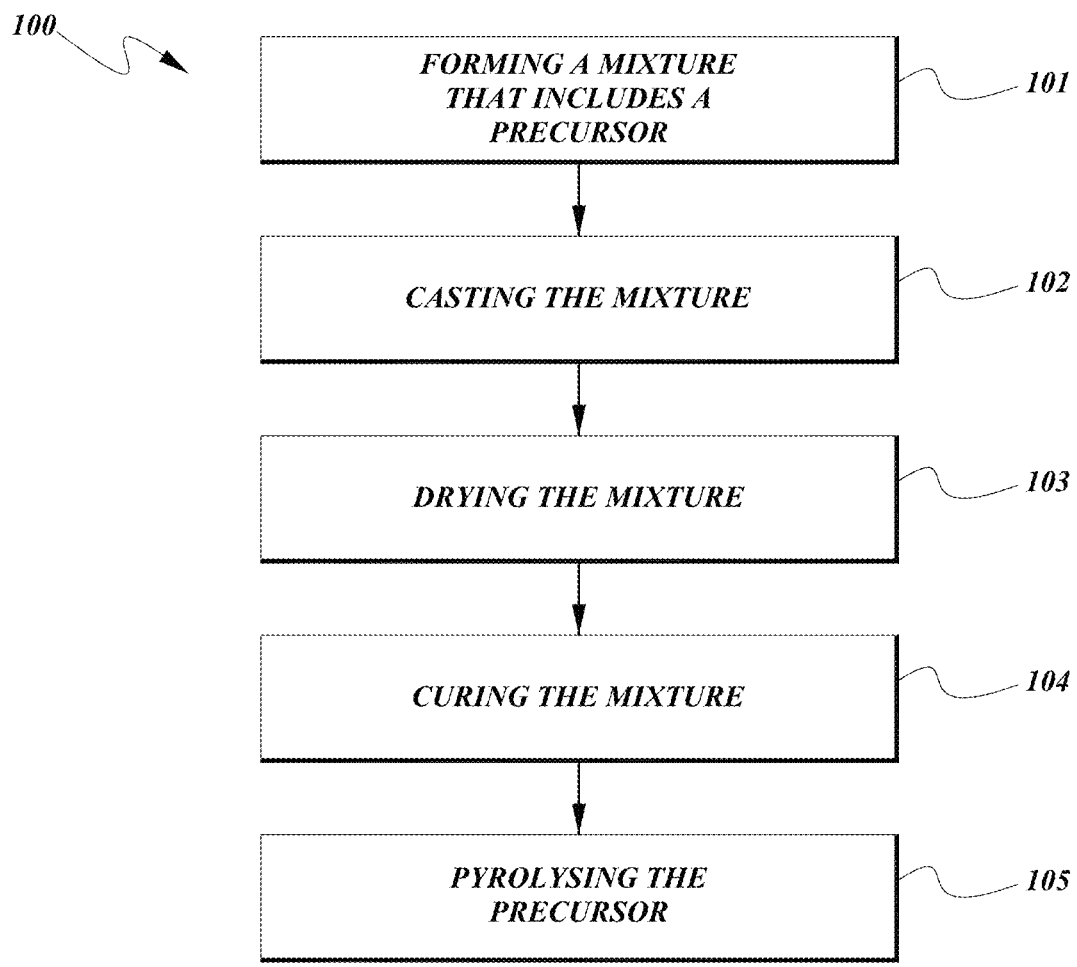
FIG. 1 illustrates an embodiment of a method of forming a composite material that includes forming a mixture that includes a precursor, casting the mixture, drying the mixture, curing the mixture, and pyrolysing the precursor.

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrode. Small particle sizes (for example, sizes in the nanometer range) generally can increase cycle life performance. They also can display very high irreversible capacity. However, small particle sizes also can result in very low volumetric energy density (for example, for the overall cell stack) due to the difficulty of packing the active material. Larger particle sizes, (for example, sizes in the micrometer or micron range) generally can result in higher density anode material. However, the expansion of the silicon active material can result in poor cycle life due to particle cracking. For example, silicon can swell in excess of 300% upon lithium insertion. Because of this expansion, anodes including silicon should be allowed to expand while maintaining electrical contact between the silicon particles.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

The composite materials described herein can be used as an anode in most conventional lithium ion batteries; they may also be used as the cathode in some electrochemical couples with additional additives. The composite materials can also be used in either secondary batteries (e.g., rechargeable) or primary batteries (e.g., non-rechargeable). In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials. Certain embodiments described herein can further include composite materials including micron-sized silicon particles. For example, in some embodiments, the micron-sized silicon particles have nanometer-sized features on the surface. Silicon particles with such a geometry may have the benefits of both micron-sized silicon particles (e.g., high energy density) and nanometer-sized silicon particles (e.g., good cycling behavior). As used herein, the term "silicon particles" in general include micron-sized silicon particles with or without nanometer-sized features.

FIG. 1 illustrates one embodiment of a method of forming a composite material 100. For example, the method of forming a composite material can include forming a mixture including a precursor, block 101. The method can further include pyrolysing the precursor to convert the precursor to a carbon phase. The precursor mixture may include carbon additives such as graphite active material, chopped or milled carbon fiber, carbon nanofibers, carbon nanotubes, and/or other carbons. After the precursor is pyrolyzed, the resulting carbon material can be a self-supporting monolithic structure. In certain embodiments, one or more materials are added to the mixture to form a composite material. For example, silicon particles can be added to the mixture. The carbonized precursor results in an electrochemically active structure that holds the composite material together. For example, the carbonized precursor can be a substantially continuous phase. The silicon particles, including micron-sized silicon particles with or without nanometer-sized features, may be distributed throughout the composite material. Advantageously, the carbonized precursor can be a structural material as well as an electro-chemically active and electrically conductive material. In certain embodiments, material particles added to the mixture are homogenously or substantially homogeneously distributed throughout the composite material to form a homogeneous or substantially homogeneous composite.

The mixture can include a variety of different components. The mixture can include one or more precursors. In certain embodiments, the precursor is a hydrocarbon compound. For example, the precursor can include polyamic acid, polyimide, etc. Other precursors can include phenolic resins, epoxy resins, and/or other polymers. The mixture can further include a solvent. For example, the solvent can be N-methyl-pyrrolidone (NMP). Other possible solvents include acetone, diethyl ether, gamma butyrolactone, isopropanol, dimethyl carbonate, ethyl carbonate, dimethoxyethane, ethanol, methanol, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrrolidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor in the solvent is about 10 wt. % to about 30 wt. %. Additional materials can also be included in the mixture. For example, as previously discussed, silicon particles or carbon particles including graphite active material, chopped or milled carbon fiber, carbon nanofibers, carbon nanotubes, and other conductive carbons can be added to the mixture. In addition, the mixture can be mixed to homogenize the mixture.

In certain embodiments, the mixture is cast on a substrate, block 102 in FIG. 1. In some embodiments, casting includes using a gap extrusion or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent, block 103. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some embodiments, the substrate comprises polyethylene terephthalate (PET), including for example Mylar®. In certain embodiments, the dried mixture is a film or sheet. In some embodiments, the dried mixture is cured, block 104. A hot press can be used to cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In other embodiments, there is no substrate for casting and the anode film does not need to be removed from any substrate. The dried mixture may be cut or mechanically sectioned into smaller pieces.

The mixture further goes through pyrolysis to convert the polymer precursor to carbon, block 105. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein can be carried out in a continuous process. In certain embodiments, casting, drying, curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or siliconcarbon-carbon (e.g., at least one first phase comprising silicon, at least one second phase comprising carbon, and at least one third phase comprising carbon) composite material. Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon loses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can ensure that electrical contact to the surface of the silicon is not lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

In some embodiments, a largest dimension of the silicon particles can be less than about 40 µm, less than about 1 µm, between about 10 nm and about 40 µm, between about 10 nm and about 1 µm, less than about 500 nm, less than about 100 nm, and about 100 nm. All, substantially all, or at least some of the silicon particles may comprise the largest dimension described above. For example, an average or median largest dimension of the silicon particles can be less than about 40 µm, less than about 1 µm, between about 10 nm and about 40 µm, between about 10 nm and about 1 µm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 90% by weight, including from about 30% to about 80% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 µm and about 30 µm or between about 0.1 µm and all values up to about 30 µm. For example, the silicon particles can have an average particle size between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size can be any value between about 0.1 µm and about 30 µm, e.g., 0.1 µm, 0.5 µm, 1 µm, 5 µm, 10 µm, 15 µm, 20 µm, 25 µm, and 30 µm.

The nanometer-sized features can include an average feature size (e.g., an average diameter or an average largest dimension) between about 1 nm and about 1 µm, between about 1 nm and about 750 nm, between about 1 nm and about 500 nm, between about 1 nm and about 250 nm, between about 1 nm and about 100 nm, between about 10 nm and about 500 nm, between about 10 nm and about 250 nm, between about 10 nm and about 100 nm, between about 10 nm and about 75 nm, or between about 10 nm and about 50 nm. The features can include silicon.

The amount of carbon obtained from the precursor can be about 50 weight percent from polyamic acid. In certain embodiments, the amount of carbon from the precursor in the composite material is about 10% to about 25% by weight. The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. In some embodiments, the amount of hard carbon in the composite material has a value within a range of from about 10% to about 25% by weight, about 20% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, a largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

In certain embodiments, an electrode can include a composite material described herein. For example, a composite material can form a self-supported monolithic electrode. The pyrolysed carbon phase (e.g., hard carbon phase) of the composite material can hold together and structurally support the particles that were added to the mixture. In certain embodiments, the self-supported monolithic electrode does not include a separate collector layer and/or other supportive structures. In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity. For example, the porosity can be about 5% to about 40% by volume porosity.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In certain embodiments, an electrode in a battery or electrochemical cell can include a composite material, including composite material with the silicon particles described herein. For example, the composite material can be used for the anode and/or cathode. In certain embodiments, the battery is a lithium ion battery. In further embodiments, the battery is a secondary battery, or in other embodiments, the battery is a primary battery.

Furthermore, the full capacity of the composite material may not be utilized during use of the battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

Silicon Particles

Described herein are silicon particles for use in battery electrodes (e.g., anodes and cathodes). Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. Because of this expansion, anodes including silicon should be able to expand while allowing for the silicon to maintain electrical contact with the silicon.

Some embodiments provide silicon particles that can be used as an electro-chemically active material in an electrode. The electrode may include binders and/or other electro-chemically active materials in addition to the silicon particles. For example, the silicon particles described herein can be used as the silicon particles in the composite materials described herein. In another example, an electrode can have an electro-chemically active material layer on a current collector, and the electro-chemically active material layer includes the silicon particles. The electro-chemically active material may also include one or more types of carbon.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

In certain embodiments, the silicon particles have an average particle size, for example an average diameter or an average largest dimension, between about 10 nm and about 40 μm. Further embodiments include average particle sizes of between about 1 μm and about 15 μm, between about 10 nm and about 1 μm, and between about 100 nm and about 10 μm. Silicon particles of various sizes can be separated by various methods such as by air classification, sieving or other screening methods. For example, a mesh size of 325 can be used separate particles that have a particle size less than about 44 μm from particles that have a particle size greater than about 44 μm.

Furthermore, the silicon particles may have a distribution of particle sizes. For example, at least about 90% of the particles may have particle size, for example a diameter or a largest dimension, between about 10 nm and about 40 µm, between about 1 µm and about 15 µm, between about 10 nm and about 1 µm, and/or larger than 200 nm.

In some embodiments, the silicon particles may have an average surface area per unit mass of between about 1 to about 100 m$^2$/g, about 1 to about 80 m$^2$/g, about 1 to about 60 m$^2$/g, about 1 to about 50 m$^2$/g, about 1 to about 30 m$^2$/g, about 1 to about 10 m$^2$/g, about 1 to about 5 m$^2$/g, about 2 to about 4 m$^2$/g, or less than about 5 m$^2$/g.

In certain embodiments, the silicon particles are at least partially crystalline, substantially crystalline, and/or fully crystalline. Furthermore, the silicon particles may be substantially pure silicon.

Figure 2A:
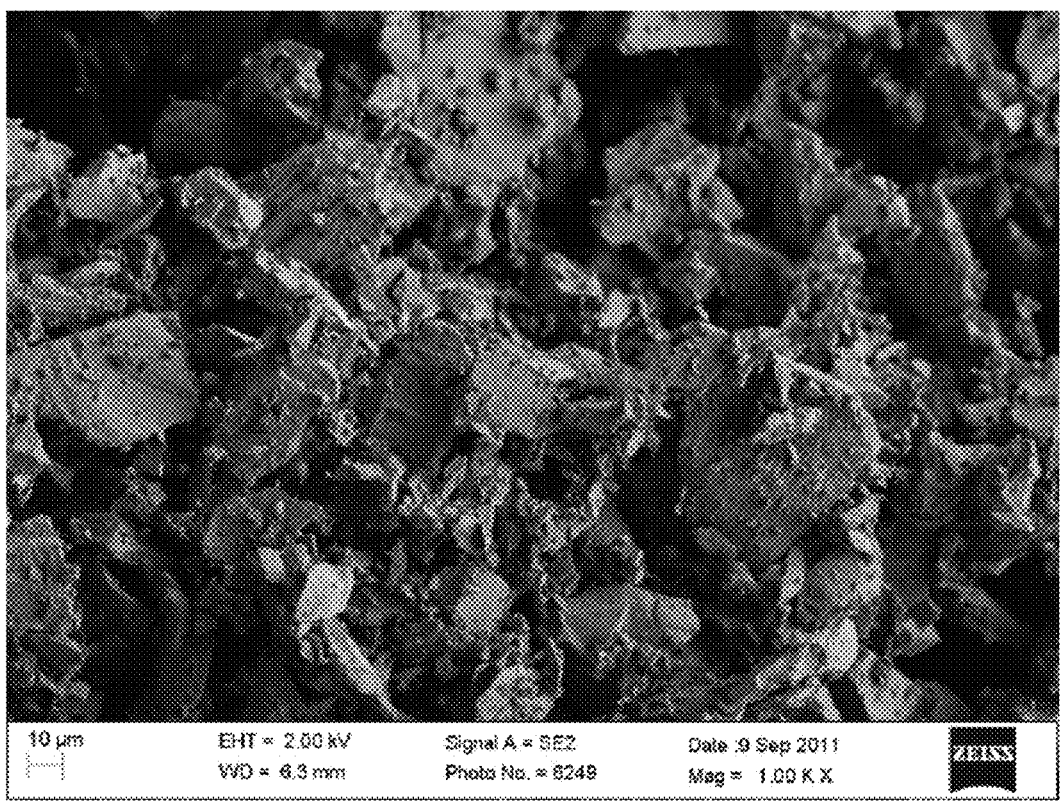
FIGS. 2A and 2B are SEM micrographs of one embodiment of micron-sized silicon particles milled-down from larger silicon particles.
Figure 2B:
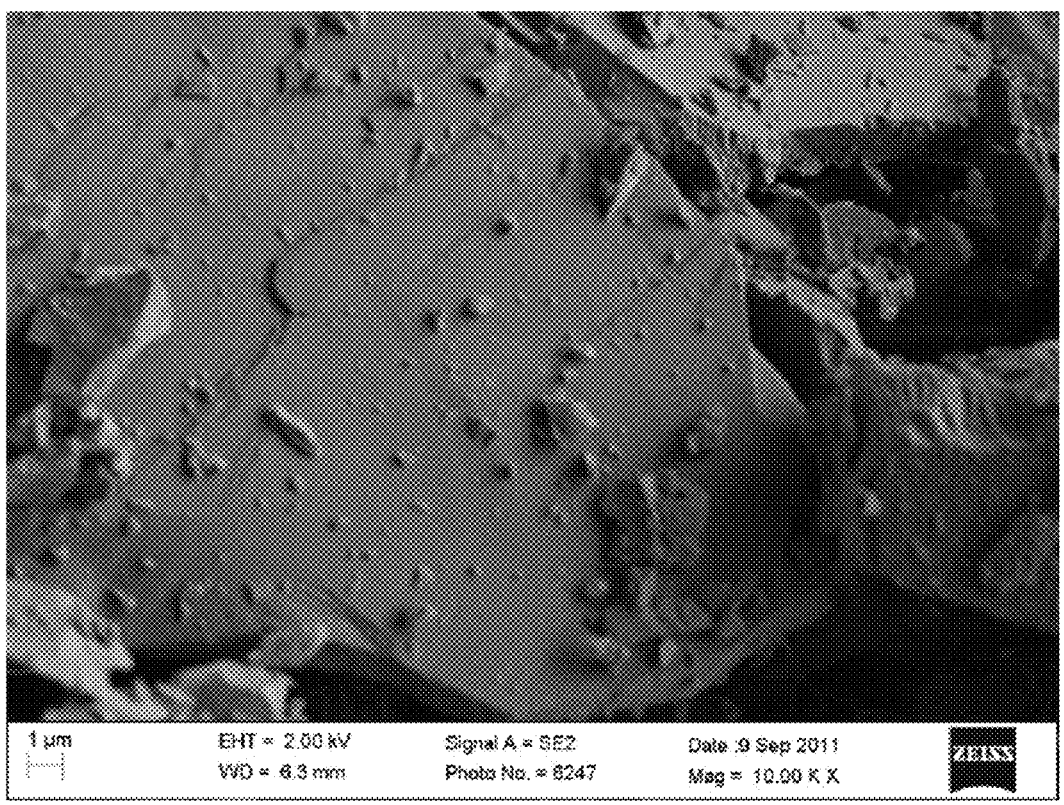

Compared with the silicon particles used in conventional electrodes, the silicon particles described herein generally have a larger average particle size. In some embodiments, the average surface area of the silicon particles described herein is generally smaller. Without being bound to any particular theory, the lower surface area of the silicon particles described herein may contribute to the enhanced performance of electrochemical cells. Typical lithium ion type rechargeable battery anodes would contain nano-sized silicon particles. In an effort to further increase the capacity of the cell, smaller silicon particles (such as those in nano-size ranges) are being used for making the electrode active materials. In some cases, the silicon particles are milled to reduce the size of the particles. Sometimes the milling may result in roughened or scratched particle surface, which also increases the surface area. However, the increased surface area of silicon particles may actually contribute to increased degradation of electrolytes, which lead to increased irreversible capacity loss. FIGS. 2A and 2B are SEM micrographs of an example embodiment of silicon particles milled-down from larger silicon particles. As shown in the figures, certain embodiments may have a roughened surface.

Figure 2C:
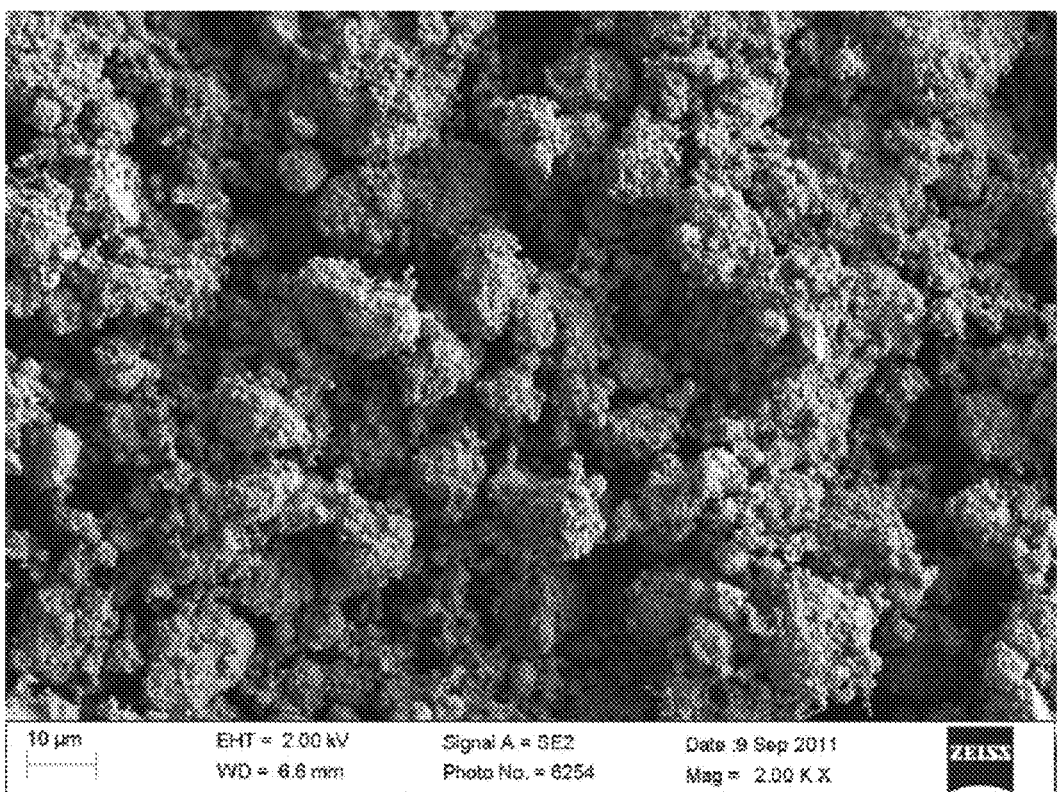
FIGS. 2C and 2D are SEM micrographs of one embodiment of micron-sized silicon particles with nanometer-sized features on the surface.
Figure 2D:
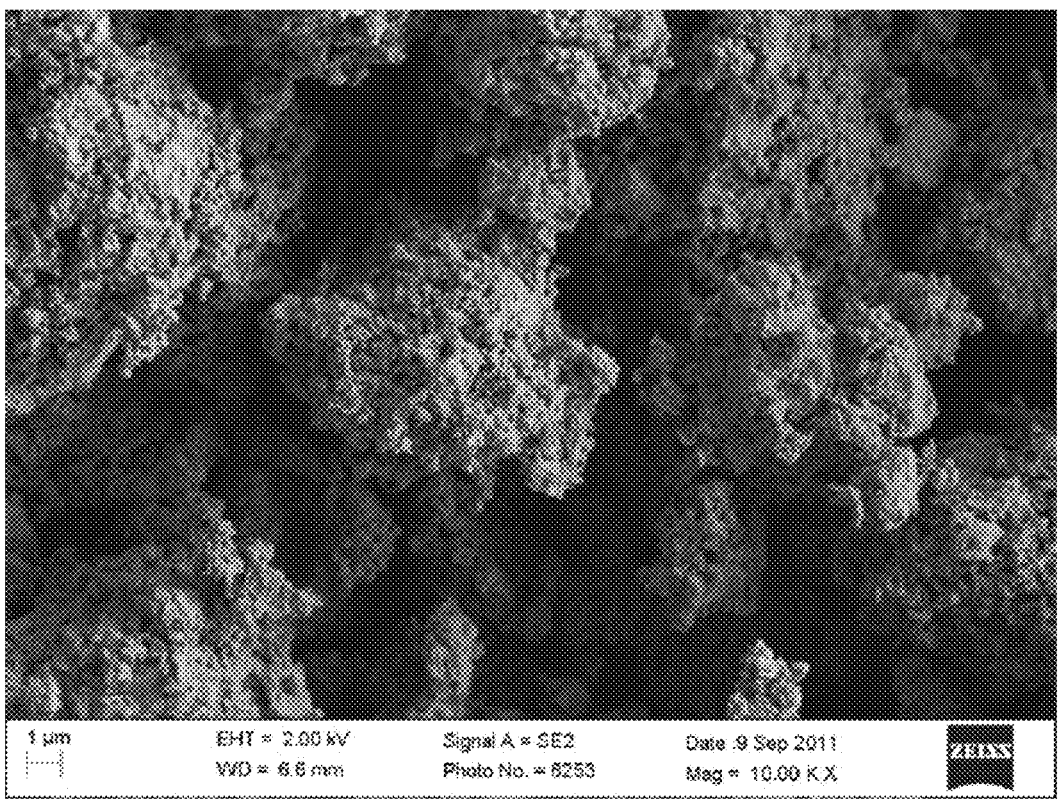

As described herein, certain embodiments include silicon particles with surface roughness in nanometer-sized ranges, e.g., micron-sized silicon particles with nanometer-sized features on the surface. FIGS. 2C and 2D are SEM micrographs of an example embodiment of such silicon particles. Various such silicon particles can have an average particle size (e.g., an average diameter or an average largest dimension) in the micron range (e.g., as described herein, between about 0.1 µm and about 30 µm) and a surface including nanometer-sized features (e.g., as described herein, between about 1 nm and about 1 µm, between about 1 nm and about 750 nm, between about 1 nm and about 500 nm, between about 1 nm and about 250 nm, between about 1 nm and about 100 nm, between about 10 nm and about 500 nm, between about 10 nm and about 250 nm, between about 10 nm and about 100 nm, between about 10 nm and about 75 nm, or between about 10 nm and about 50 nm). The features can include silicon.

Compared to the example embodiment shown in FIGS. 2A and 2B, silicon particles with a combined micron/nanometer-sized geometry (e.g., FIGS. 2C and 2D) can have a higher surface area than milled-down particles. Thus, the silicon particles to be used can be determined by the desired application and specifications.

Even though certain embodiments of silicon particles have nanometer-sized features on the surface, the total surface area of the particles can be more similar to micron-sized particles than to nanometer-sized particles. For example, micron-sized silicon particles (e.g., silicon milled-down from large particles) typically have an average surface area per unit mass of over about 0.5 m$^2$/g and less than about 2 m$^2$/g (for example, using Brunauer Emmet Teller (BET) particle surface area measurements), while nanometer-sized silicon particles typically have an average surface area per unit mass of above about 100 m$^2$/g and less than about 500 m$^2$/g. Certain embodiments described herein can have an average surface area per unit mass between about 1 m$^2$/g and about 30 m$^2$/g, between about 1 m$^2$/g and about 25 m$^2$/g, between about 1 m$^2$/g and about 20 m$^2$/g, between about 1 m$^2$/g and about 10 m$^2$/g, between about 2 m$^2$/g and about 30 m$^2$/g, between about 2 m$^2$/g and about 25 m$^2$/g, between about 2 m$^2$/g and about 20 m$^2$/g, between about 2 m$^2$/g and about 10 m$^2$/g, between about 3 m$^2$/g and about 30 m$^2$/g, between about 3 m$^2$/g and about 25 m$^2$/g, between about 3 m$^2$/g and about 20 m$^2$/g, between about 3 m$^2$/g and about 10 m$^2$/g (e.g., between about 3 m$^2$/g and about 6 m$^2$/g), between about 5 m$^2$/g and about 30 m$^2$/g, between about 5 m$^2$/g and about 25 m$^2$/g, between about 5 m$^2$/g and about 20 m$^2$/g, between about 5 m$^2$/g and about 15 m$^2$/g, or between about 5 m$^2$/g and about 10 m$^2$/g.

Figure 3:
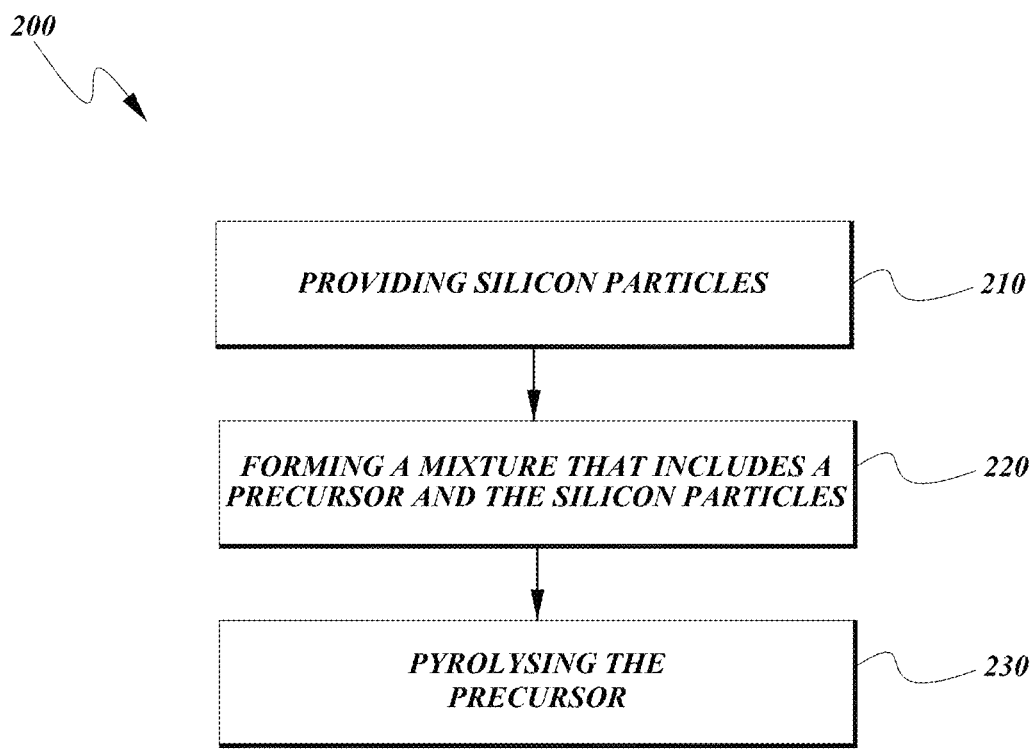
FIG. 3 illustrates an example embodiment of a method of forming a composite material.

Various examples of micron-sized silicon particles with nanometer-sized features can be used to form certain embodiments of composite materials as described herein. For example, FIG. 3 illustrates an example method 200 of forming certain embodiments of the composite material. The method 200 includes providing a plurality of silicon particles (for example, silicon particles having an average particle size between about 0.1 µm and about 30 µm and a surface including nanometer-sized features), block 210. The method 200 further includes forming a mixture that includes a precursor and the plurality of silicon particles, block 220. The method 200 further includes pyrolysing the precursor, block 230, to convert the precursor into one or more types of carbon phases to form the composite material.

With respect to block 210 of method 200, silicon with the characteristics described herein can be synthesized as a product or byproduct of a Fluidized Bed Reactor (FBR) process. For example, in the FBR process, useful material can be grown on seed silicon material. Typically, particles can be removed by gravity from the reactor. Some fine particulate silicon material can exit the reactor from the top of the reactor or can be deposited on the walls of the reactor. The material that exits the top of the reactor or is deposited on the walls of the reactor (e.g., byproduct material) can have nanoscale features on a microscale particle. In some such processes, a gas (e.g., a nitrogen carrier gas) can be passed through the silicon material. For example, the silicon material can be a plurality of granular silicon. The gas can be passed through the silicon material at high enough velocities to suspend the solid silicon material and make it behave as a fluid. The process can be performed under an inert atmosphere, e.g., under nitrogen or argon. In some embodiments, silane gas can also be used, for example, to allow for metal silicon growth on the surface of the silicon particles. The growth process from a gas phase can give the silicon particles the unique surface characteristics, e.g., nanometer-sized features. Since silicon usually cleaves in a smooth shape, e.g., like glass, certain embodiments of silicon particles formed using the FBR process can advantageously acquire small features, e.g., in nanometer-sized ranges, that may not be as easily achievable in some embodiments of silicon particles formed by milling from larger silicon particles.

In addition, since the FBR process can be under an inert atmosphere, very high purity particles (for example, higher than 99.9999% purity) can be achieved. In some embodiments, purity of between about 99.9999% and about 99.999999% can be achieved. In some embodiments, the FBR process can be similar to that used in the production of solar-grade polysilicon while using 85% less energy than the traditional Siemens method, where polysilicon can be formed as trichlorosilane decomposes and deposits additional silicon material on high-purity silicon rods at 1150° C. Because nanometer-sized silicon particles have been shown to increase cycle life performance in electrochemical cells, micron-sized silicon particles have not been contemplated for use as electrochemical active materials in electrochemical cells.

With respect to blocks 220 and 230 of method 200, forming a mixture that includes a precursor and the plurality of silicon particles, block 220, and pyrolysing the precursor, block 230, to convert the precursor into one or more types of carbon phases to form the composite material can be similar to blocks 101 and 105 respectively, of method 100 described herein. In some embodiments, pyrolysing (e.g., at about 900° C. to about 1350° C.) occurs at temperatures below the melting point of silicon (e.g., at about 1414° C.) without affecting the nanometer-sized features of the silicon particles.

In accordance with certain embodiments described herein, certain micron-sized silicon particles with nanometer surface feature can achieve high energy density, and can be used in composite materials and/or electrodes for use in electro-chemical cells to improve performance during cell cycling.

EXAMPLES

The below example processes for anode fabrication generally include mixing components together, casting those components onto a removable substrate, drying, curing, removing the substrate, then pyrolysing the resulting samples. N-Methyl-2-pyrrolidone (NMP) was typically used as a solvent to modify the viscosity of any mixture and render it castable using a doctor blade approach.

Example 1

In Example 1, a polyimide liquid precursor (PI 2611 from HD Microsystems corp.), graphite particles (SLP30 from Timcal corp.), conductive carbon particles (Super P from Timcal corp.), and silicon particles (from Alfa Aesar corp.) were mixed together for 5 minutes using a Spex 8000D machine in the weight ratio of 200:55:5:20. The mixture was then cast onto aluminum foil and allowed to dry in a 90° C. oven, to drive away solvents, e.g., NMP. This is followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 15.8% of PI 2611 derived carbon, 57.9% of graphite particles, 5.3% of carbon resulting from Super P, and 21.1% of silicon by weight.

Figure 4:
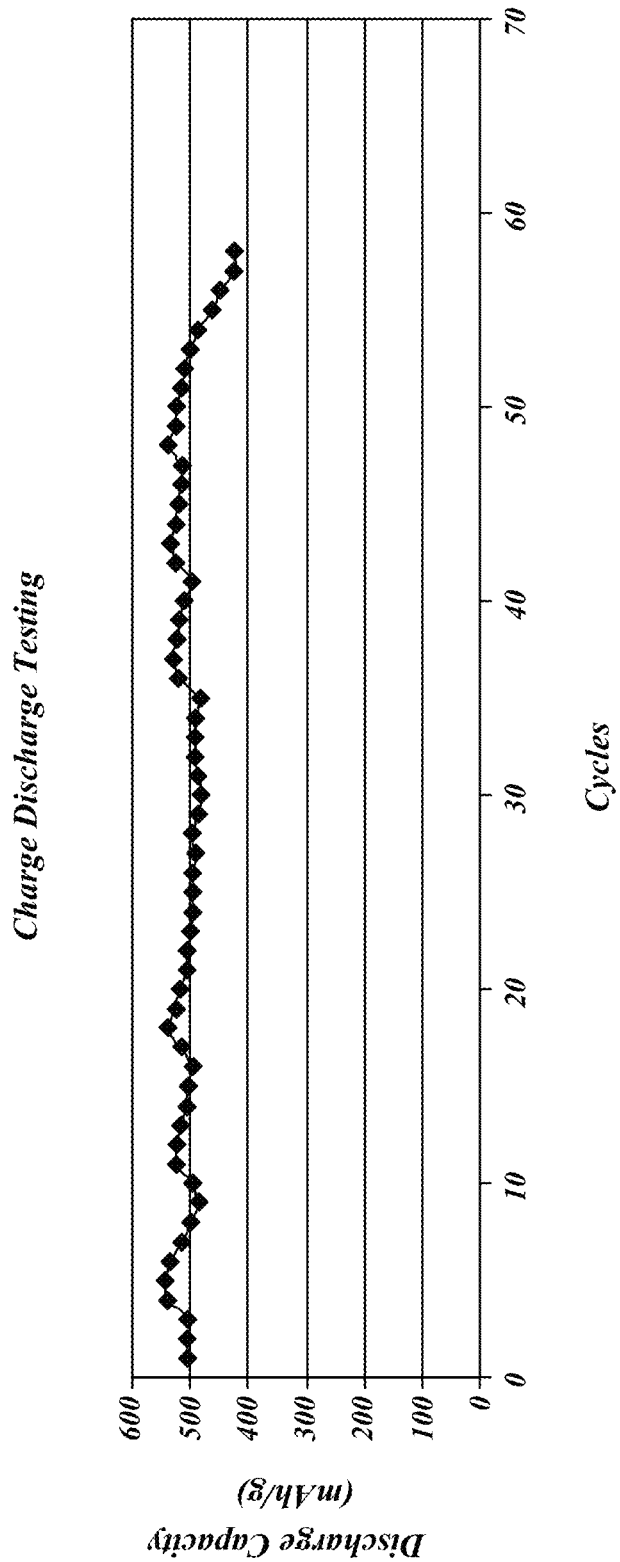
FIG. 4 is a plot of the discharge capacity at an average rate of C/2.6.

The resulting electrodes were then tested in a pouch cell configuration against a lithium NMC oxide cathode. A typical cycling graph is shown in FIG. 4.

Example 2

In Example 2, silicon particles (from EVNANO Advanced Chemical Materials Co., Ltd.) were initially mixed with NMP using a Turbula mixer for a duration of one hour at a 1:9 weight ratio. Polyimide liquid precursor (PI 2611 from HD Microsystems corp.), graphite particles (SLP30 from Timcal corp.), and carbon nanofibers (CNF from Pyrograf corp.) were then added to the Si:NMP mixture in the weight ratio of 200:55:5:200 and vortexed for around 2 minutes. The mixture was then cast onto aluminum foil that was covered by a 21 μm thick copper mesh. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1000° C. under argon. The process resulted in a composition of 15.8% of PI 2611 derived carbon, 57.9% of graphite particles, 5.3% of CNF, and 21.1% of silicon by weight.

Figure 5:
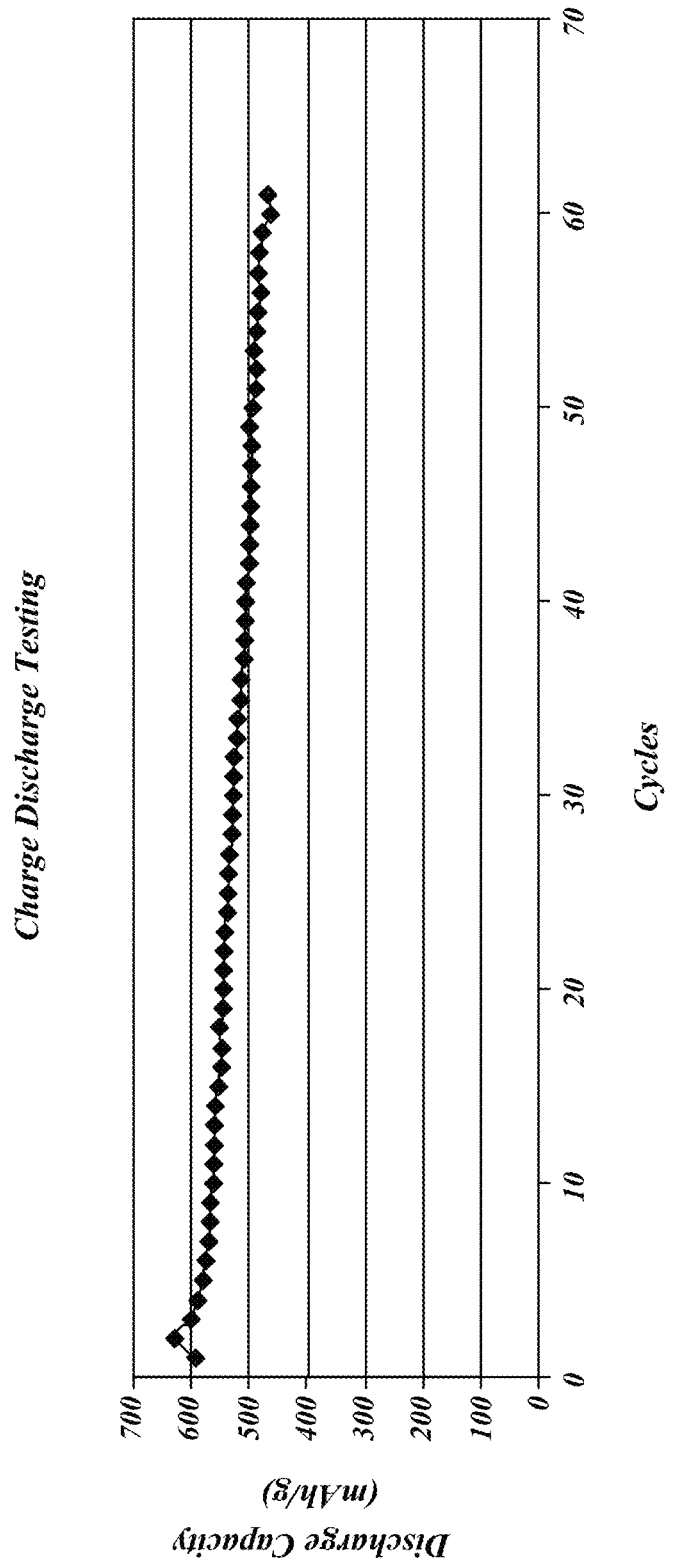
FIG. 5 is a plot of the discharge capacity at an average rate of C/3.

The resulting electrodes were then tested in a pouch cell configuration against a lithium NMC oxide cathode. A typical cycling graph is shown in FIG. 5.

Example 3

In Example 3, polyimide liquid precursor (PI 2611 from HD Microsystems corp.), and 325 mesh silicon particles (from Alfa Aesar corp.) were mixed together using a Turbula mixer for a duration of 1 hour in the weight ratios of 40:1. The mixture was then cast onto aluminum foil and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 75% of PI 2611 derived carbon and 25% of silicon by weight.

Figure 6:
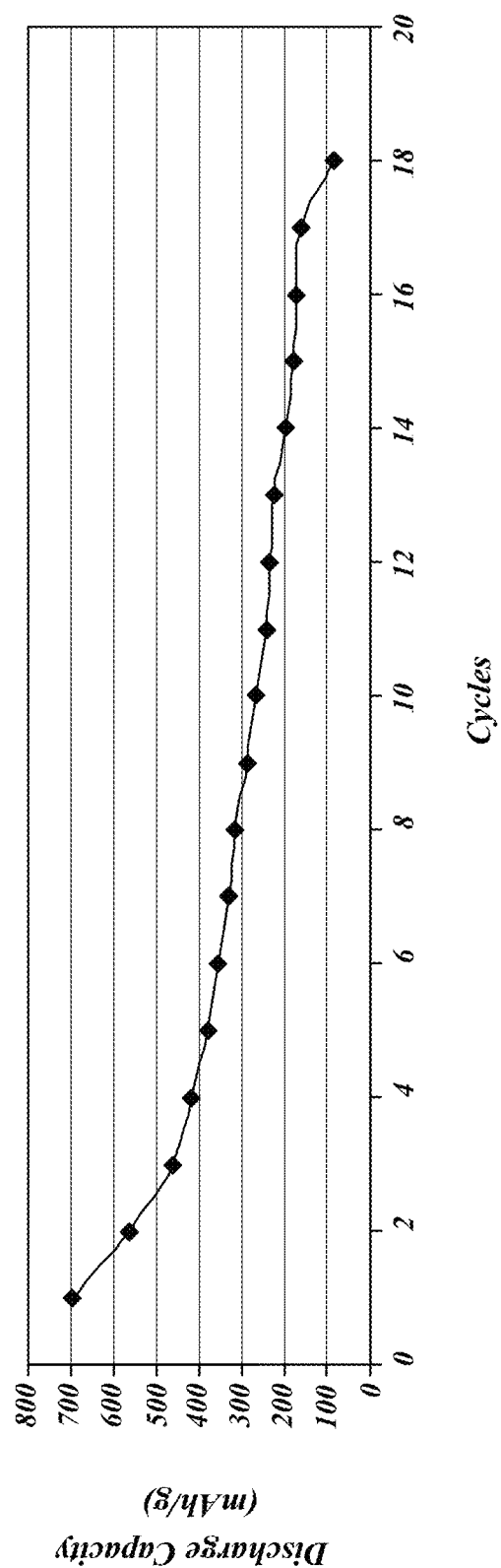
FIG. 6 is a plot of the discharge capacity at an average rate of C/3.3.

The resulting electrodes were then tested in a pouch cell configuration against a lithium NMC Oxide cathode. A typical cycling graph is shown in FIG. 6.

Example 4

In Example 4, silicon microparticles (from Alfa Aesar corp.), polyimide liquid precursor (PI 2611 from HD Microsystems corp.), graphite particles (SLP30 from Timcal corp.), milled carbon fibers (from Fibre Glast Developments corp.), carbon nanofibers (CNF from Pyrograf corp.), carbon nanotubes (from CNANO Technology Limited), conductive carbon particles (Super P from Timcal corp.), conductive graphite particles (KS6 from Timca corp.) were mixed in the weight ratio of 20:200:30:8:4:2:1:15 using a vortexer for 5 minutes. The mixture was then cast onto aluminum foil. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1175° C. under argon. The process resulted in a composition similar to the original mixture but with a PI 2611 derived carbon portion that was 7.5% the original weight of the polyimide precursor.

Figure 7:
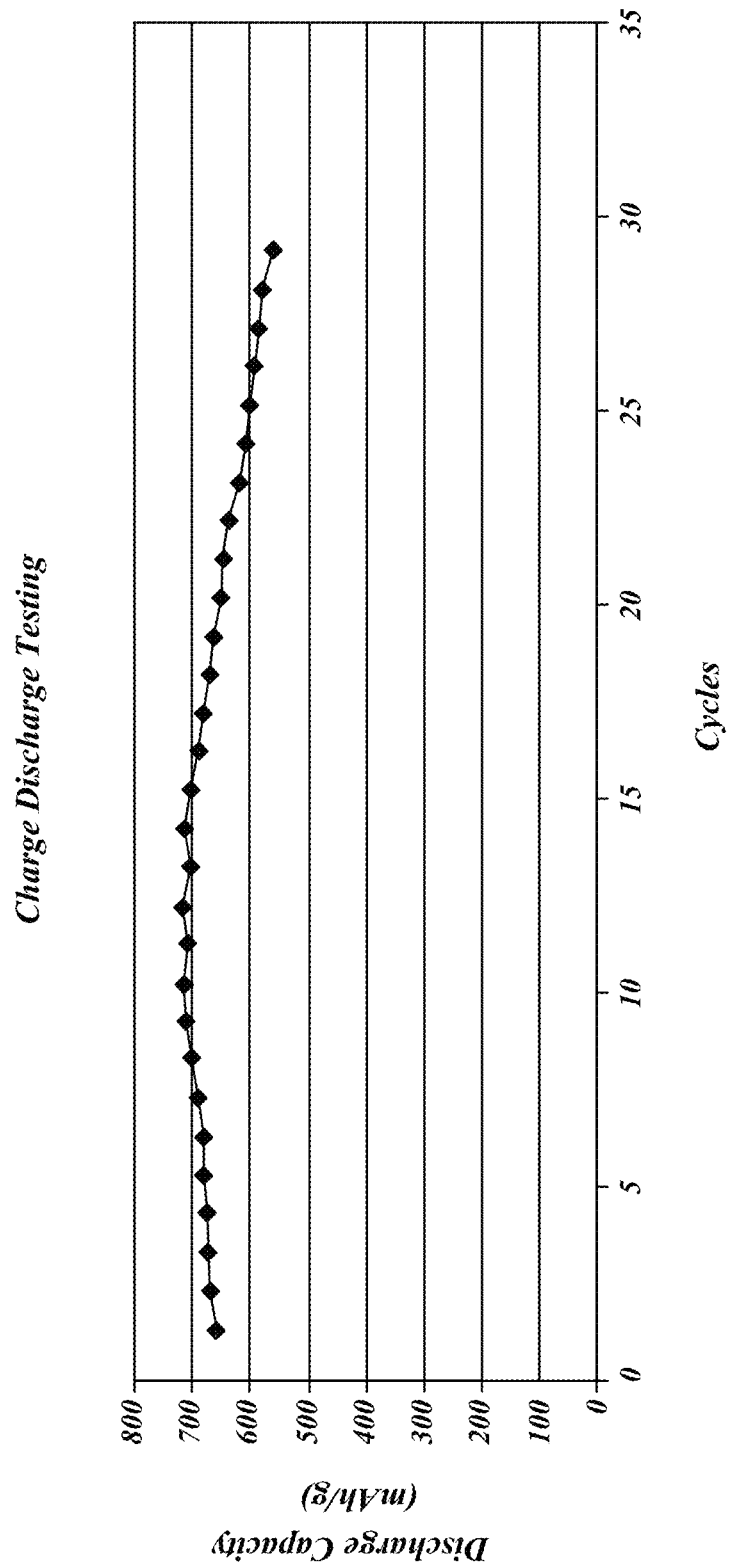
FIG. 7 is a plot of the discharge capacity at an average rate of C/5.

The resulting electrodes were then tested in a pouch cell configuration against a lithium NMC oxide cathode. A typical cycling graph is shown in FIG. 7.

Example 5

In Example 5, polyimide liquid precursor (PI 2611 from HD Microsystems corp.), and silicon microparticles (from Alfa Aesar corp.) were mixed together using a Turbula mixer for a duration of 1 hours in the weight ratio of 4:1. The mixture was then cast onto aluminum foil covered with a carbon veil (from Fibre Glast Developments Corporation) and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of approximately 23% of PI 2611 derived carbon, 76% of silicon by weight, and the weight of the veil being negligible.

Figure 8:
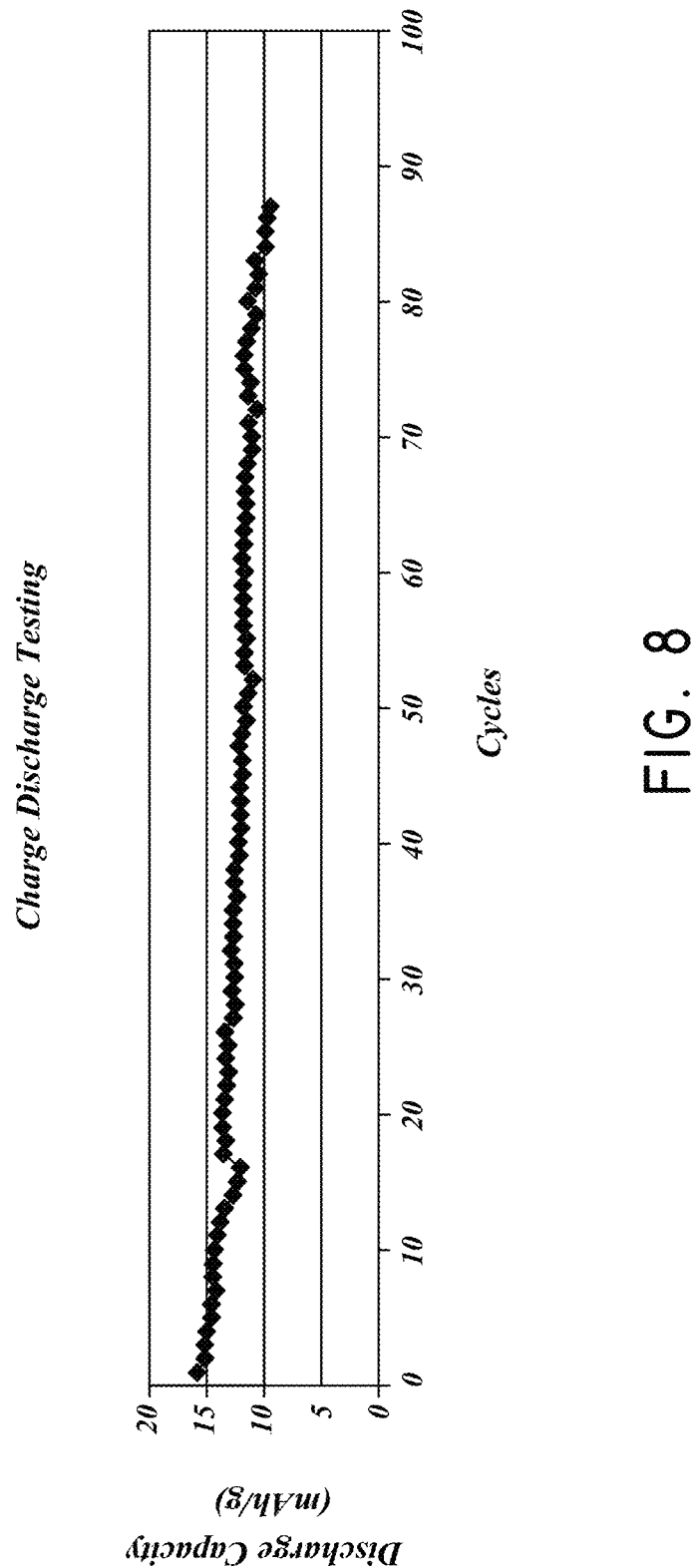
FIG. 8 is a plot of the discharge capacity at an average rate of C/9.

The resulting electrodes were then tested in a pouch cell configuration against a lithium nickel manganese cobalt oxide (NMC) cathode. A typical cycling graph is shown in FIG. 8.

Example 6

In Example 6, polyimide liquid precursor (PI 2611 from HD Microsystems corp.), graphite particles (SLP30 from Timcal corp.), and silicon microparticles (from Alfa Aesar corp.) were mixed together for 5 minutes using a Spex 8000D machine in the weight ratio of 200:10:70. The mixture was then cast onto aluminum foil and allowed to dry in a 90° C. oven, to drive away solvents (e.g., NMP). The dried mixture was cured at 200° C. in a hot press, under negligible pressure, for at least 12 hours. The aluminum foil backing was then removed by etching in a 12.5% HCl solution. The remaining film was then rinsed in DI water, dried and then pyrolyzed at 1175° C. for about one hour under argon flow. The process resulted in a composition of 15.8% of PI 2611 derived carbon, 10.5% of graphite particles, 73.7% of silicon by weight.

Figure 9:
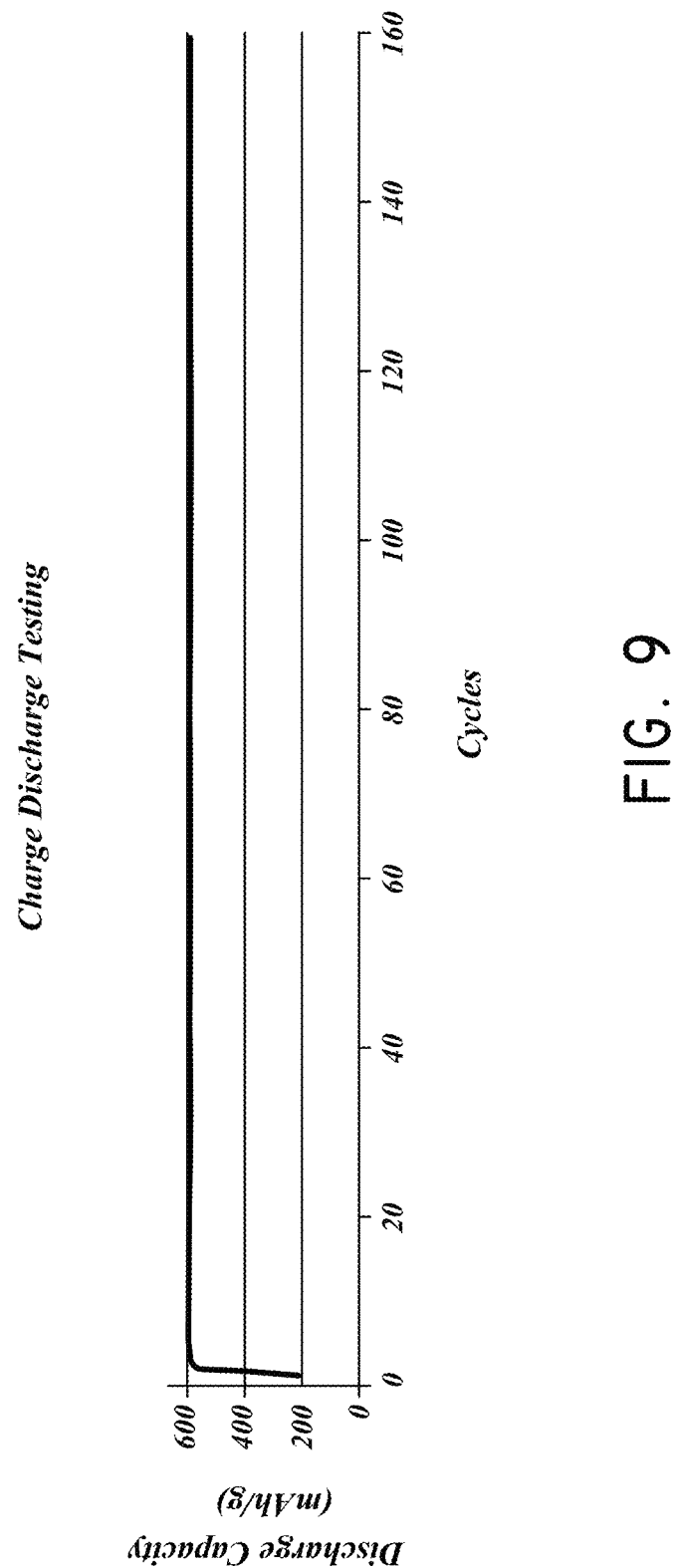
FIG. 9 is a plot of the discharge capacity.

The resulting electrodes were then tested in a pouch cell configuration against a lithium NMC oxide cathode. The anodes where charged to 600 mAh/g each cycle and the discharge capacity per cycle was recorded. A typical cycling graph is shown in FIG. 9.

Example 7

Figure 10:
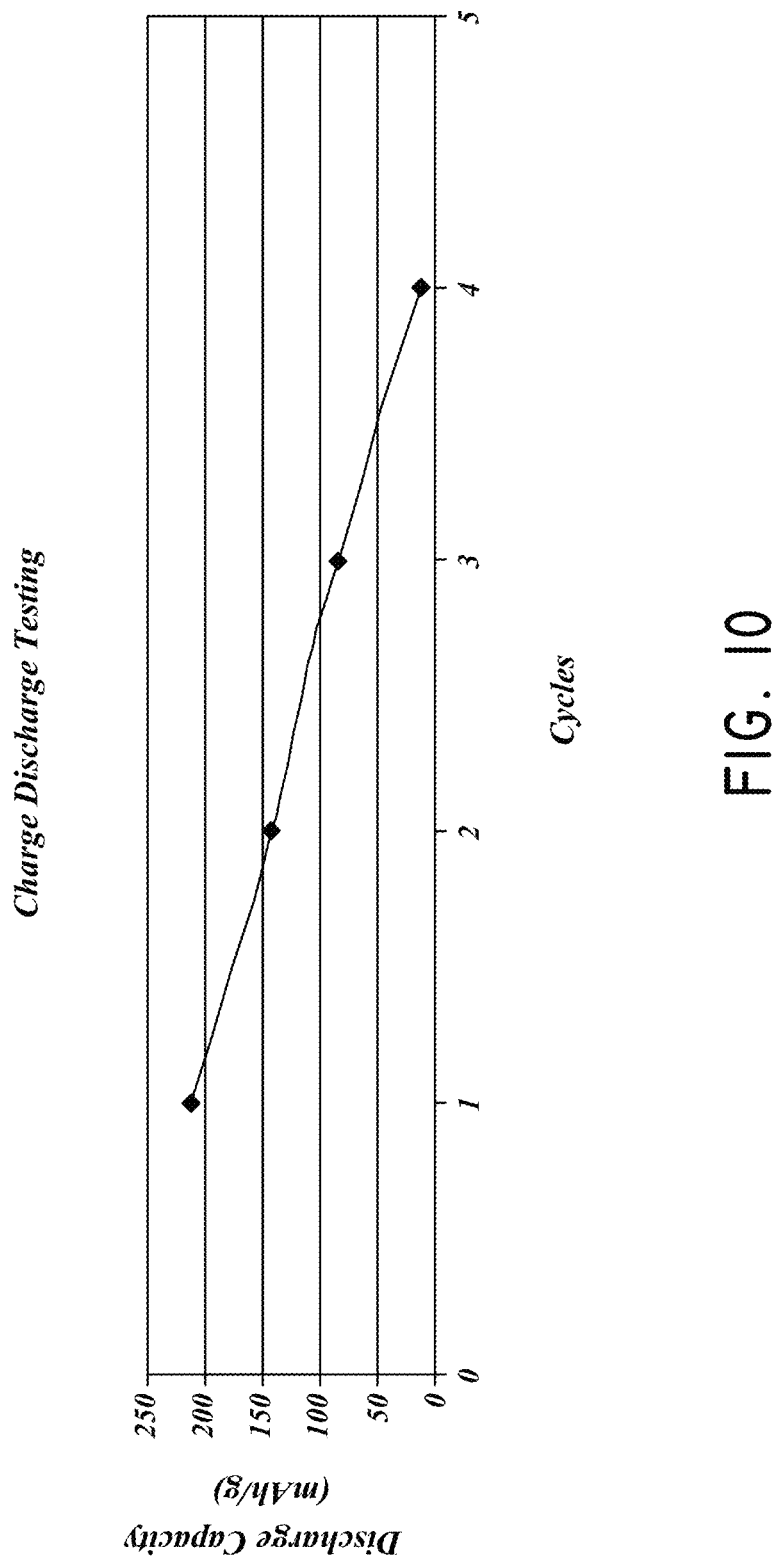
FIG. 10 is a plot of the discharge capacity at an average rate of C/9.

In Example 7, PVDF and silicon particles (from EVNANO Advanced Chemical Materials Co), conductive carbon particles (Super P from Timcal corp.), conductive graphite particles (KS6 from Timcal corp.), graphite particles (SLP30 from Timcal corp.) and NMP were mixed in the weight ratio of 5:20:1:4:70:95. The mixture was then cast on a copper substrate and then placed in a 90° C. oven to drive away solvents, e.g., NMP. The resulting electrodes were then tested in a pouch cell configuration against a lithium NMC Oxide cathode. A typical cycling graph is shown in FIG. 10.

Example 8

Multiple experiments were conducted in order to find the effects of varying the percentage of polyimide derive carbon (e.g. 2611c) while decreasing the percentage of graphite particles (SLP30 from Timcal corp.) and keeping the percentage of silicon microparticles (from Alfa Aesar corp.) at 20 wt. %.

Figure 11B:
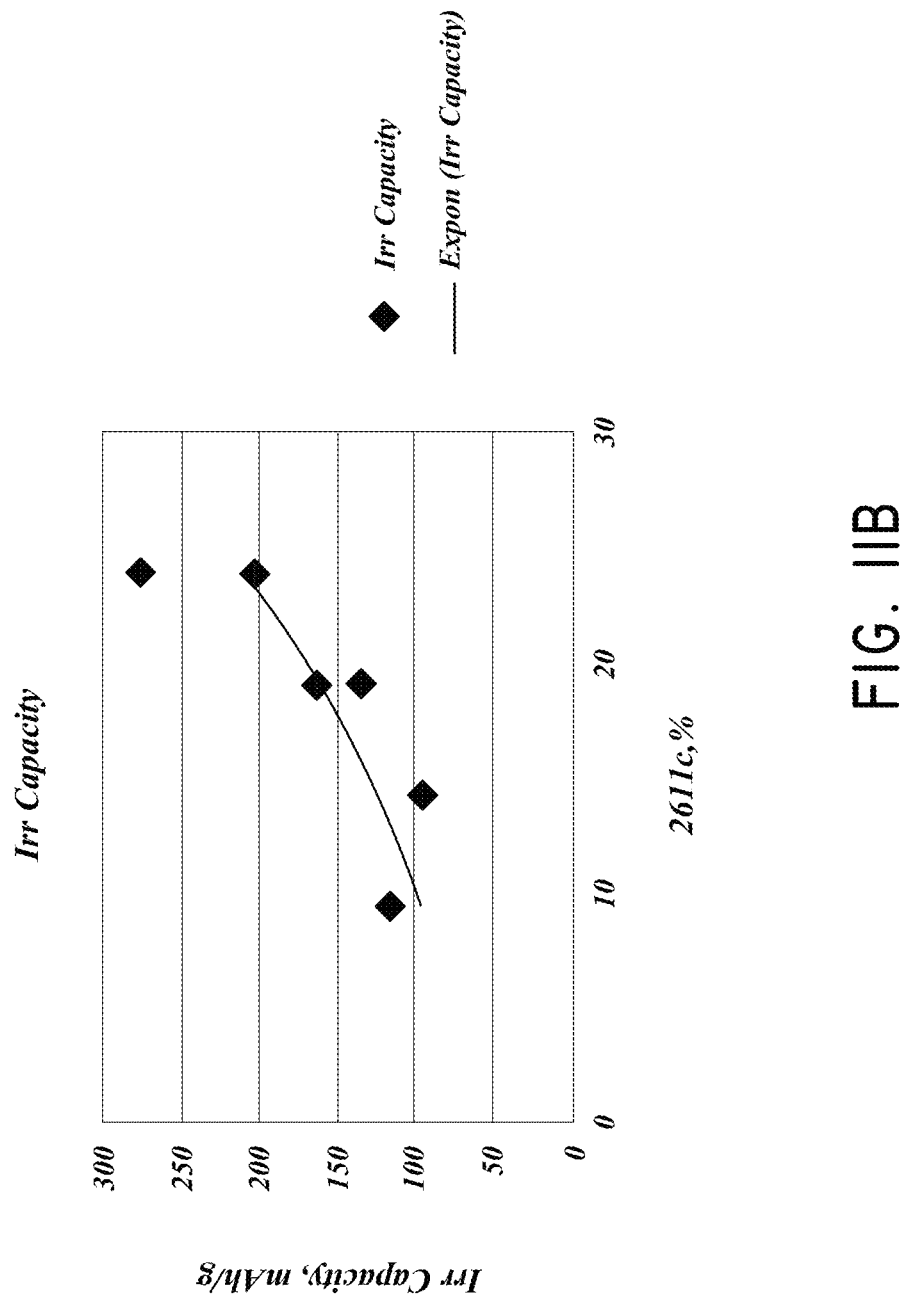

As shown in FIGS. 11A and 11B, the results show that more graphite and less 2611c was beneficial to cell performance by increasing the specific capacity while decreasing the irreversible capacity. Minimizing 2611c adversely affected the strength of the resultant anode so a value close to 20 wt. % can be preferable as a compromise in one embodiment.

Example 9

Figure 12:
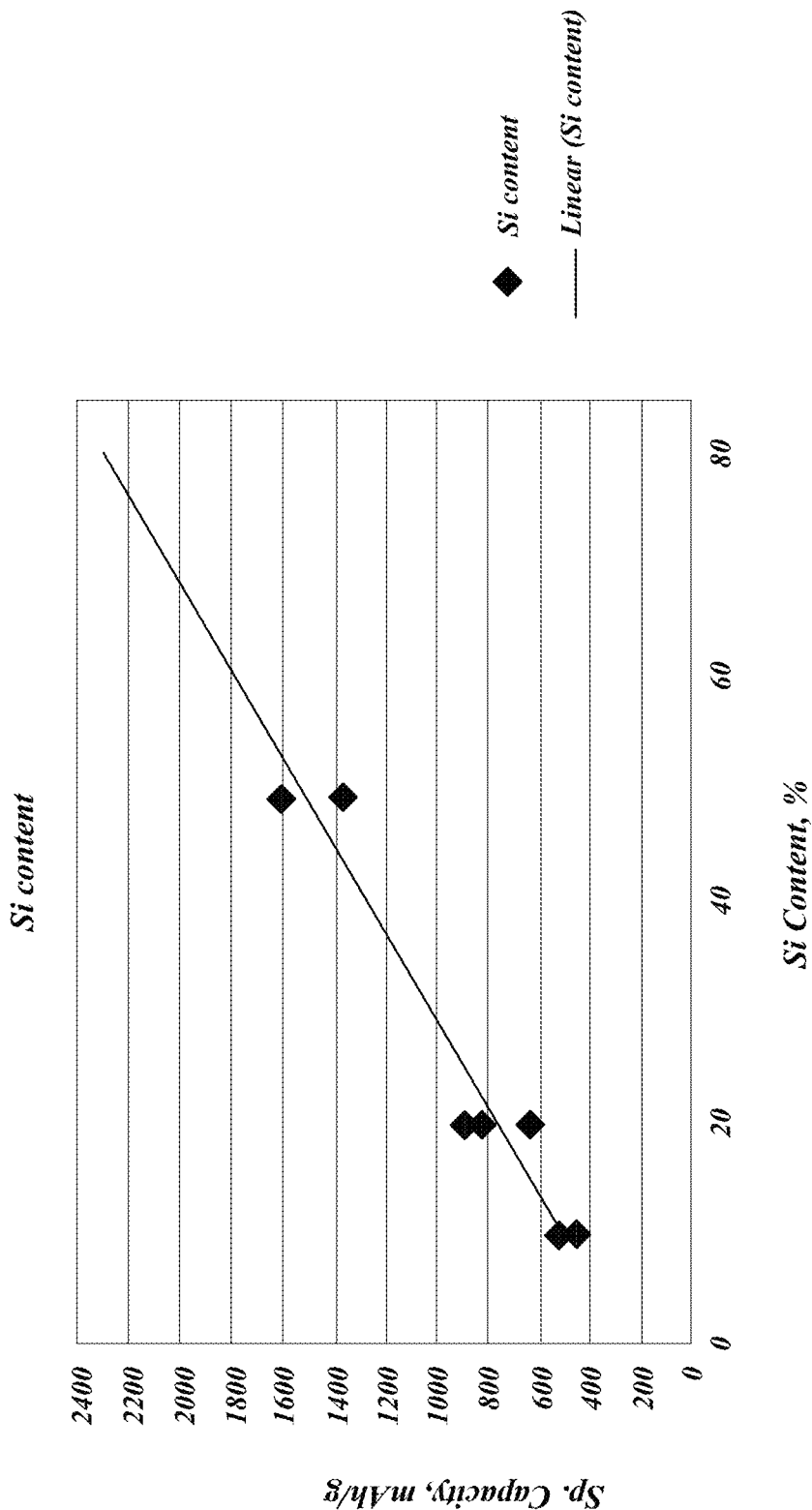
FIG. 12 is a plot of the first cycle discharge capacity as a function of weight percentage of carbon.

Similar to example 8, if 2611c is kept at 20 wt. % and Si percentage is increased at the expense of graphite particles, the first cycle discharge capacity of the resulting electrode is increased. FIG. 12 shows that a higher silicon content can make a better performing anode.

Example 10

Figure 13:
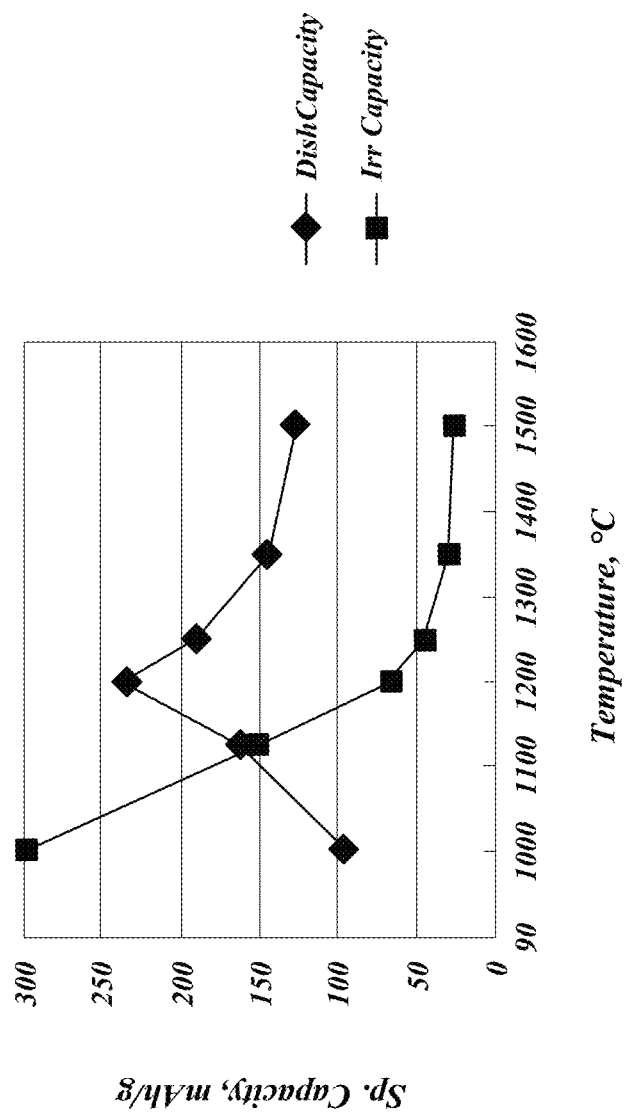
FIG. 13 is a plot of the reversible (discharge) and irreversible capacity as a function of pyrolysis temperature.

When 1 mil thick sheets of polyimide are pyrolized and tested in accordance with the procedure in Example 1. The reversible capacity and irreversible capacity were plotted as a function of the pyrolysis temperature. FIG. 13 indicates that, in one embodiment, it is preferable to pyrolyze polyimide sheets (Upilex by UBE corp) at around 1175° C.

Additional Examples

Figure 14:
FIG. 14 is a photograph of a 4.3 cm×4.3 cm composite anode film without a metal foil support layer.

FIG. 14 is a photograph of a 4.3 cm×4.3 cm composite anode film without a metal foil support layer. The composite anode film has a thickness of about 30 microns and has a composition of about 15.8% of PI 2611 derived carbon, about 10.5% of graphite particles, and about 73.7% of silicon by weight.

Figure 15:
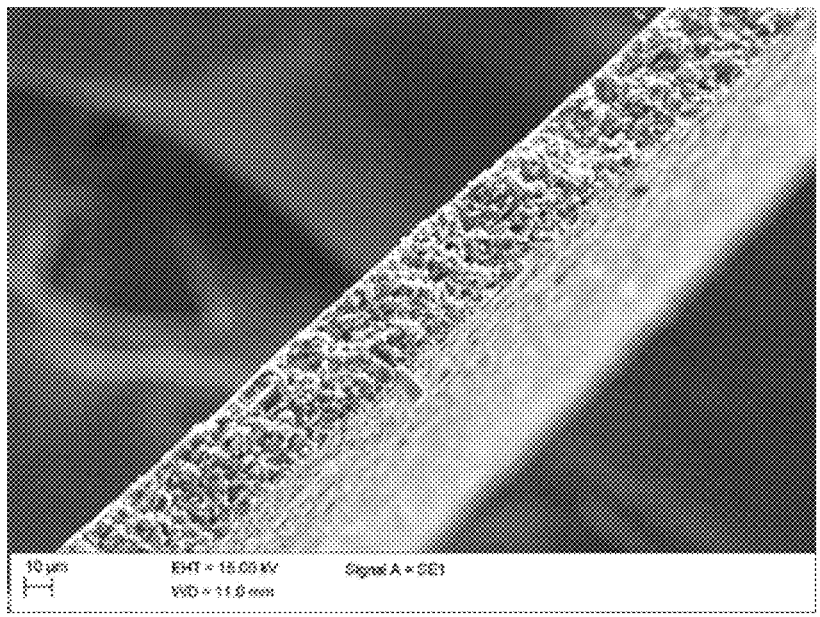
FIG. 15 is a scanning electron microscope (SEM) micrograph of a composite anode film before being cycled (the out-of-focus portion is a bottom portion of the anode and the portion that is in focus is a cleaved edge of the composite film)
Figure 16:
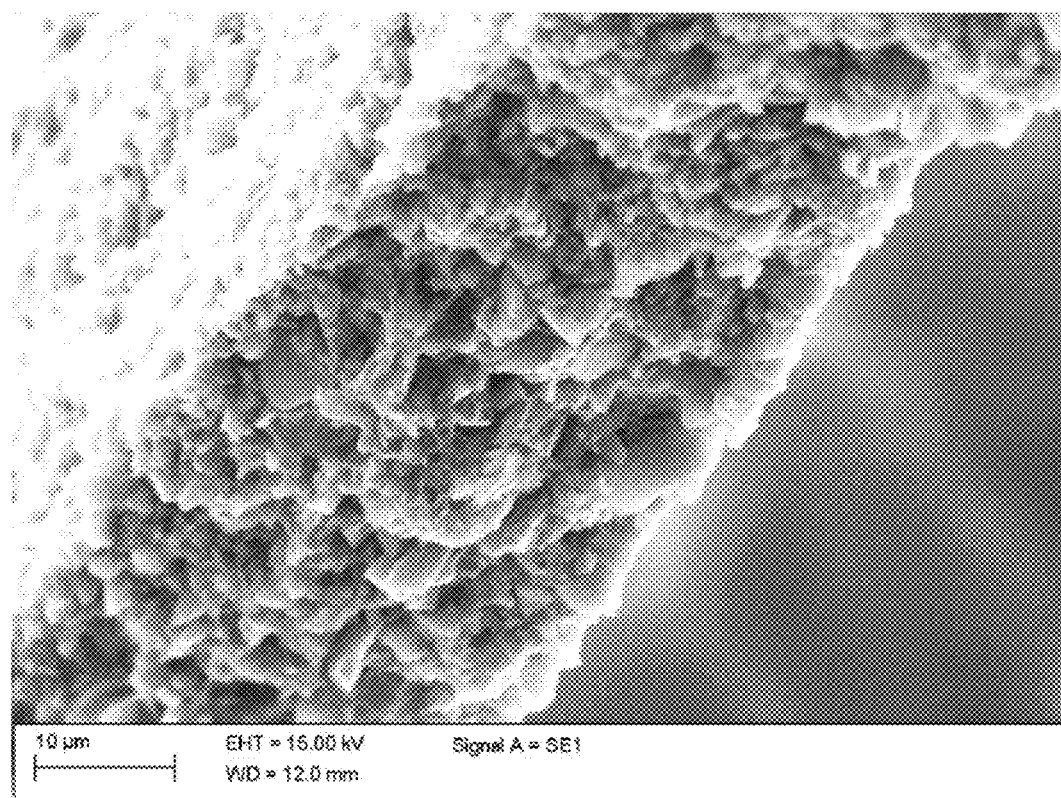
FIG. 16 is another SEM micrograph of a composite anode film before being cycled.
Figure 17:
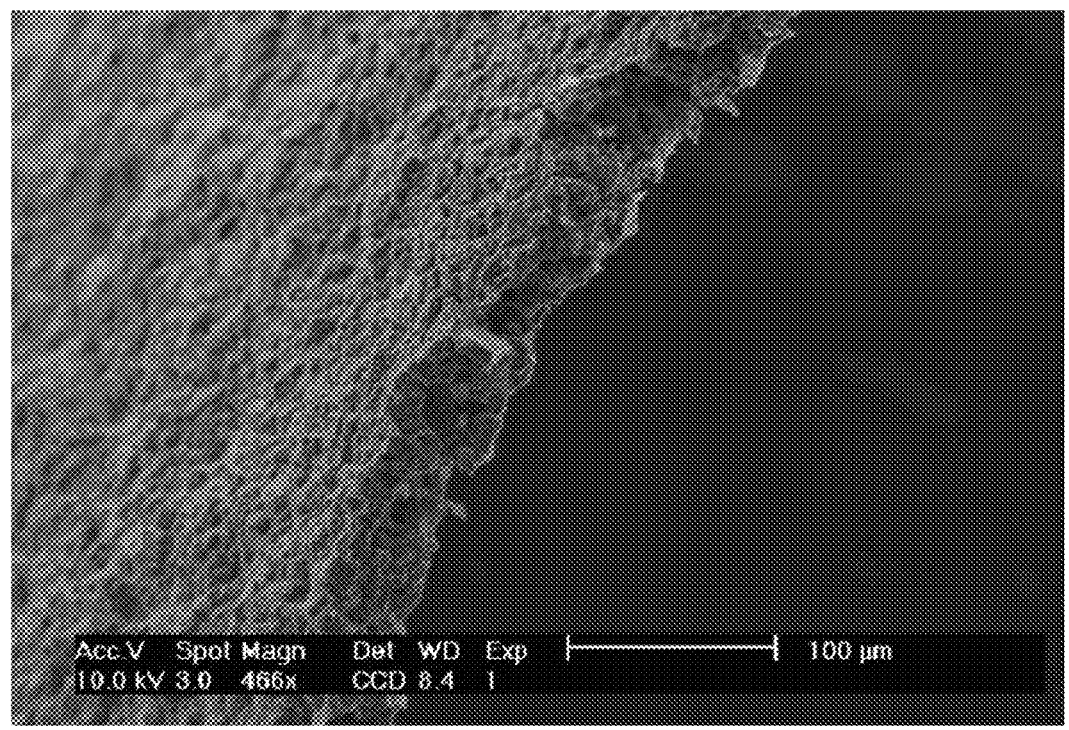
FIG. 17 is a SEM micrograph of a composite anode film after being cycled 10 cycles.
Figure 18:
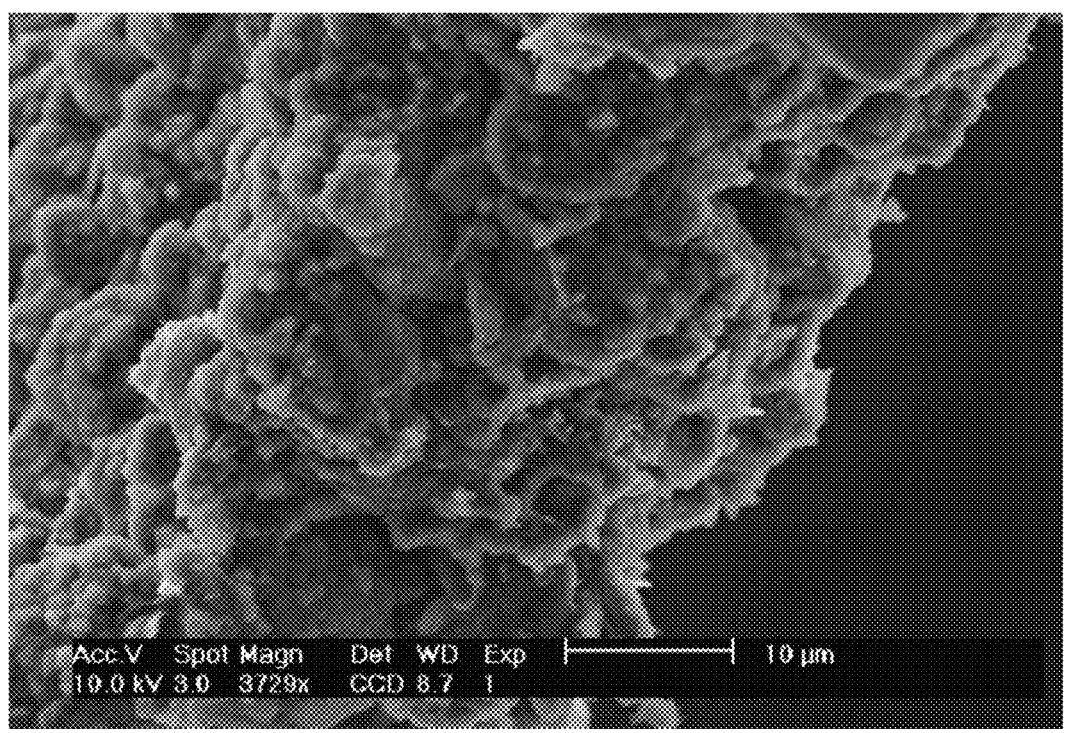
FIG. 18 is another SEM micrograph of a composite anode film after being cycled 10 cycles.
Figure 19:
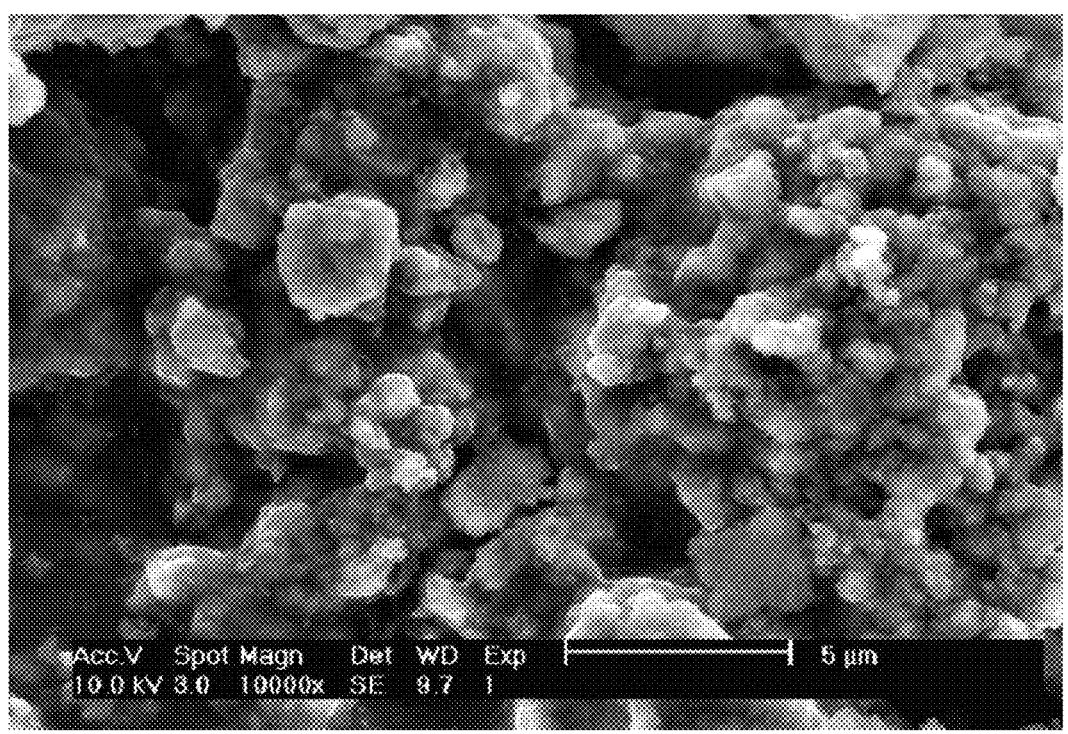
FIG. 19 is a SEM micrograph of a composite anode film after being cycled 300 cycles.
Figure 20:
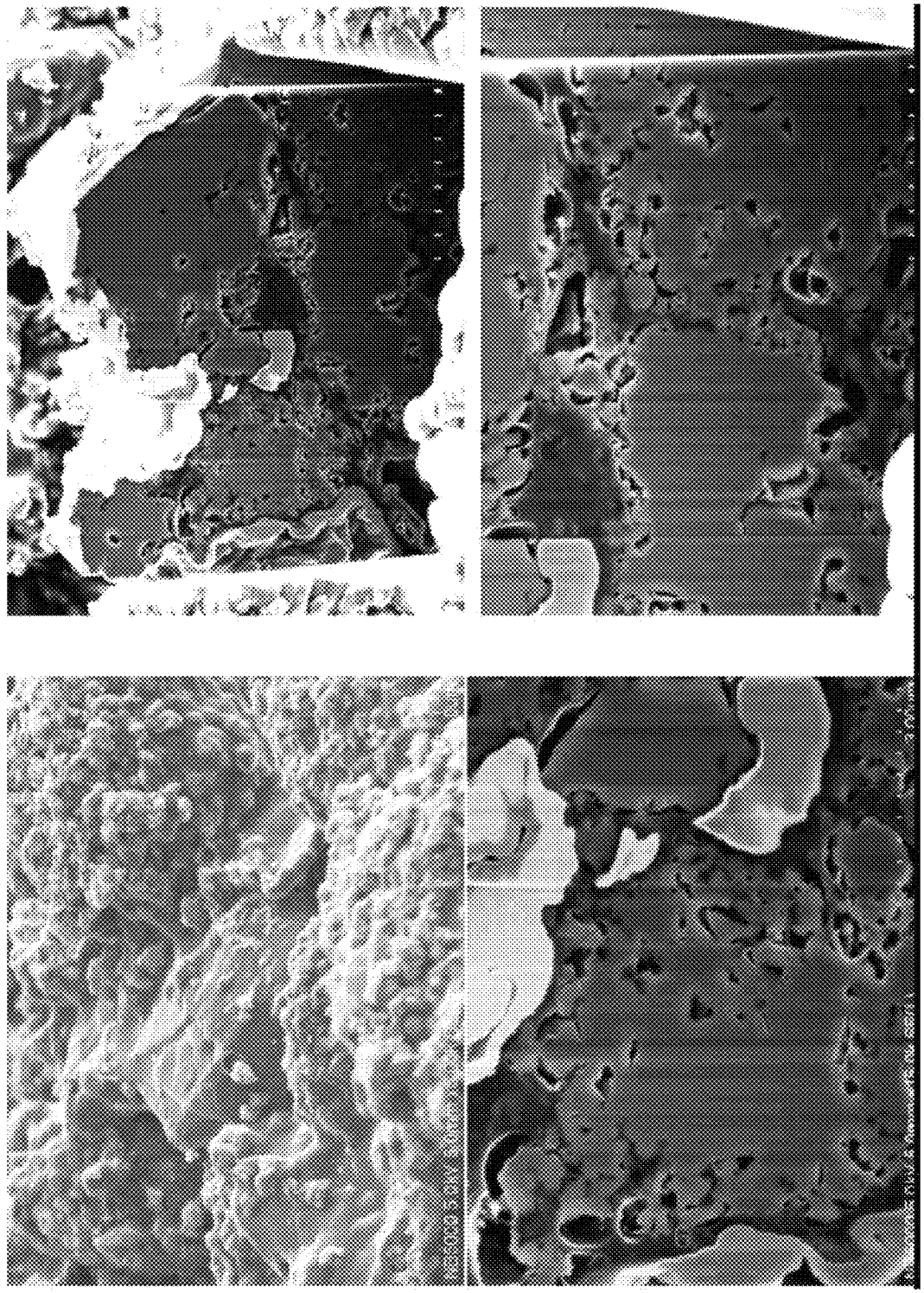
FIG. 20 includes SEM micrographs of cross-sections of composite anode films.

FIGS. 15-20 are scanning electron microscope (SEM) micrographs of a composite anode film. The compositions of the composite anode film were about 15.8% of PI 2611 derived carbon, about 10.5% of graphite particles, and about 73.7% of silicon by weight. FIGS. 15 and 16 show before being cycled (the out-of-focus portion is a bottom portion of the anode and the portion that is in focus is a cleaved edge of the composite film). FIGS. 17, 18, and 19 are SEM micrographs of a composite anode film after being cycled 10 cycles, 10 cycles, and 300 cycles, respectively. The SEM micrographs show that there is not any significant pulverization of the silicon and that the anodes do not have an excessive layer of solid electrolyte interface/interphase (SEI) built on top of them after cycling. FIG. 20 are SEM micrographs of cross-sections of composite anode films.

Described below are measured properties of example silicon particles. These examples are discussed for illustrative purposes and should not be construed to limit the scope of the disclosed embodiments.

Figure 21:
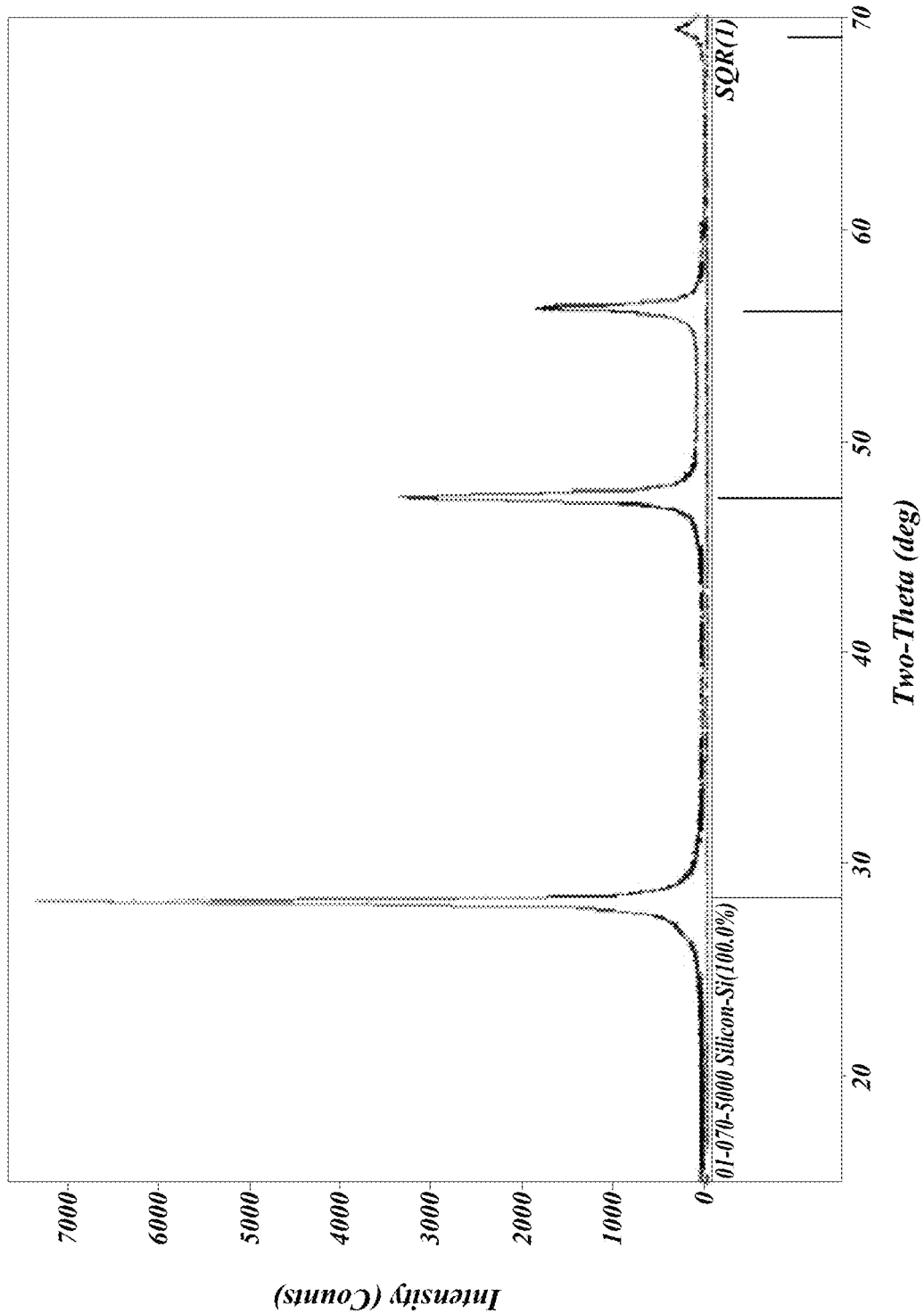
FIG. 21 is an x-ray powder diffraction (XRD) graph of the sample silicon particles.
Figure 22:
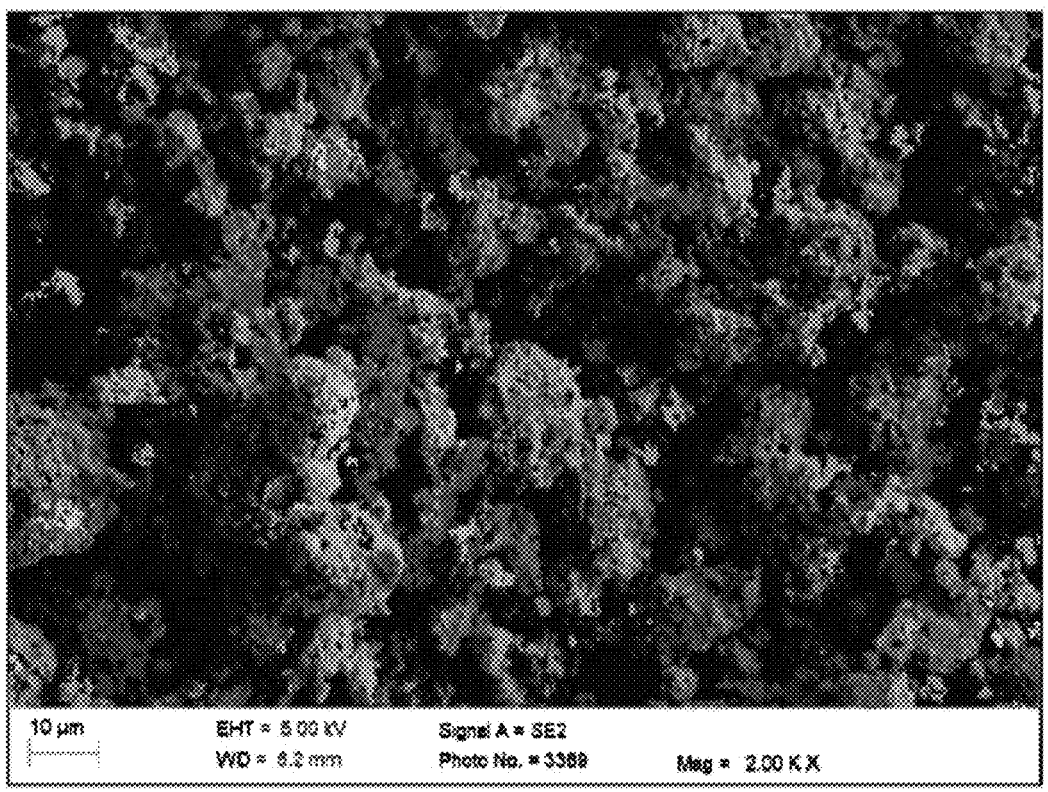
FIG. 22 is a SEM micrographs of one embodiment of silicon particles.
Figure 23:
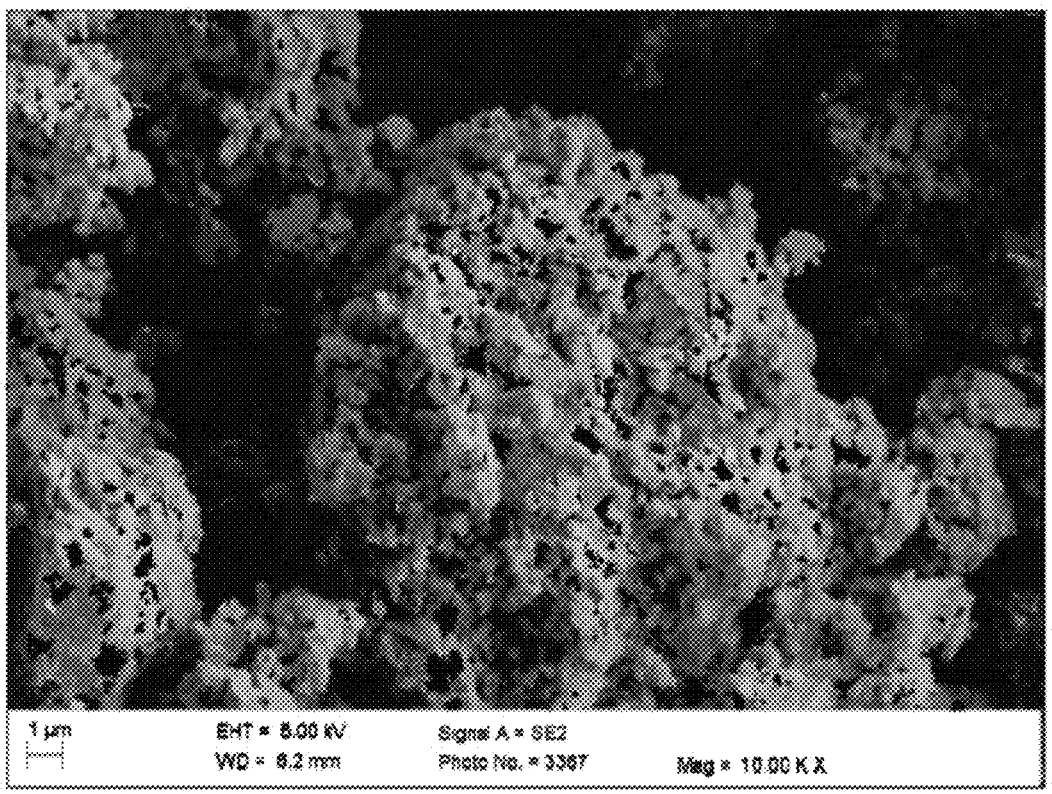
FIG. 23 is another SEM micrographs of one embodiment of silicon particles.
Figure 24:
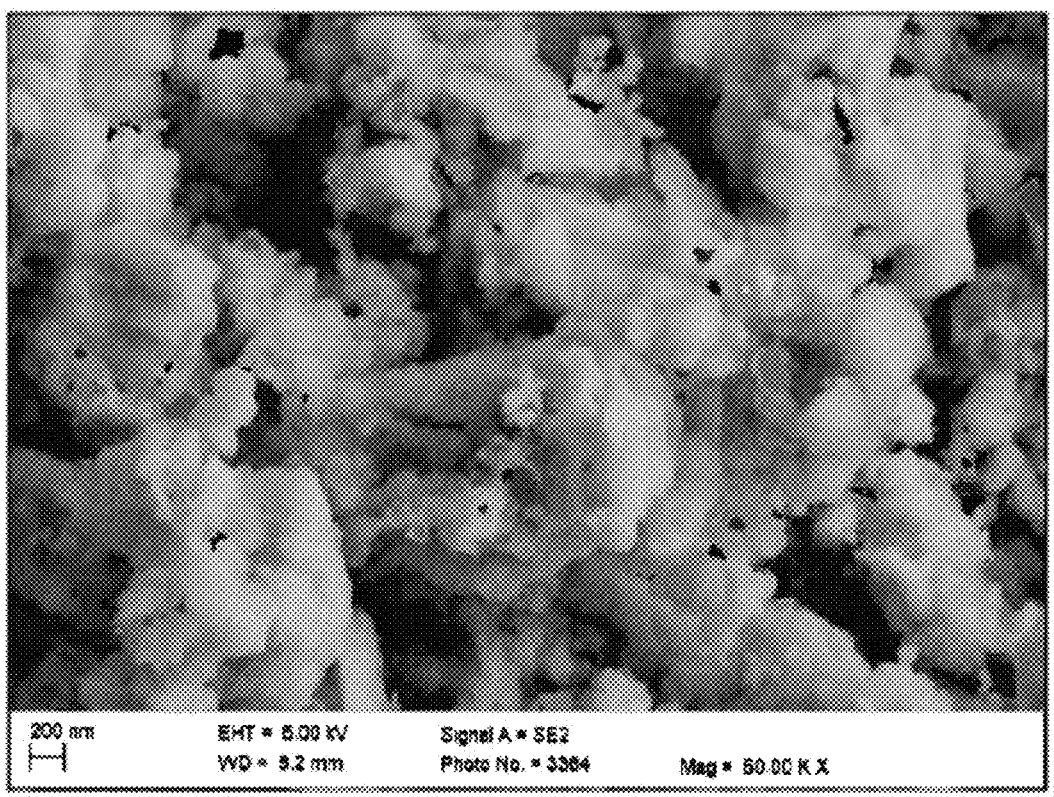
FIG. 24 is a SEM micrographs of one embodiment of silicon particles.
Figure 25:
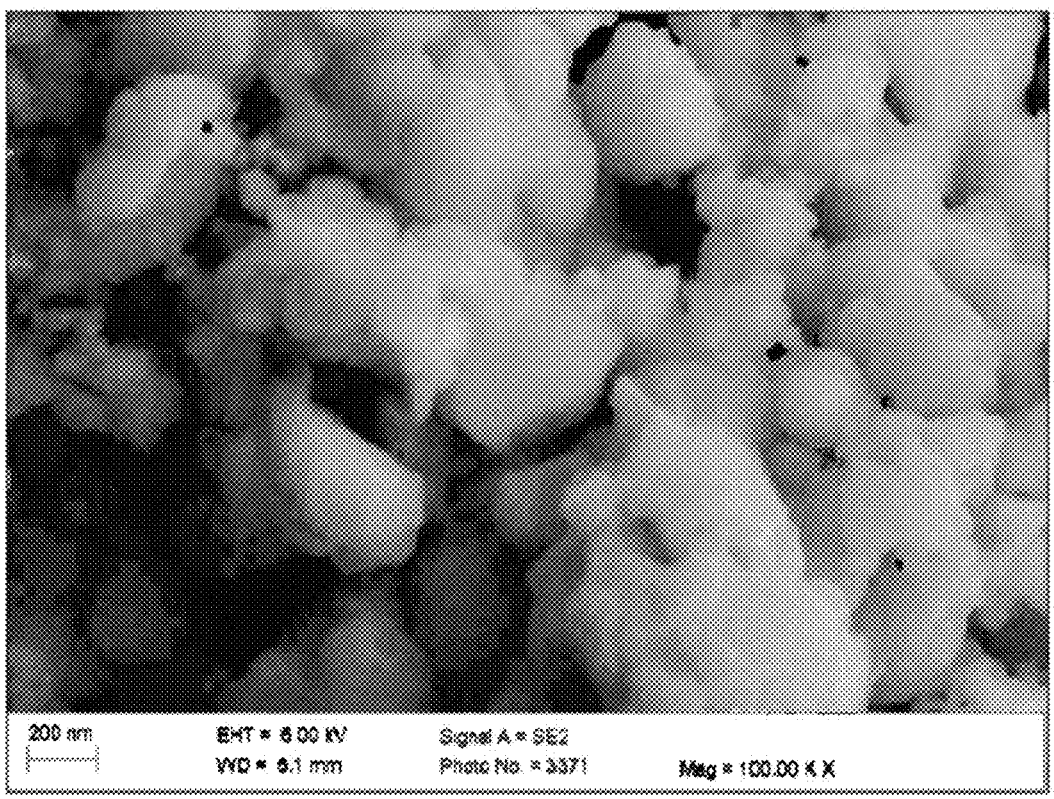
FIG. 25 is a SEM micrographs of one embodiment of silicon particles.

FIG. 21 is an x-ray powder diffraction (XRD) graph of the sample silicon particles. The XRD graph suggests that the sample silicon particles were substantially crystalline or polycrystalline in nature.

FIGS. 22-25 are scanning electron microscope (SEM) micrographs of the sample silicon particles. Although the SEM micrographs appear to show that the silicon particles may have an average particle size greater than the measured average particle size of about 300 nm, without being bound by theory, the particles are believed to have conglomerated together to appear to be larger particles.

FIG. 26 is a chemical analysis of the sample silicon particles. The chemical analysis suggests that the silicon particles were substantially pure silicon.

Figure 27A:
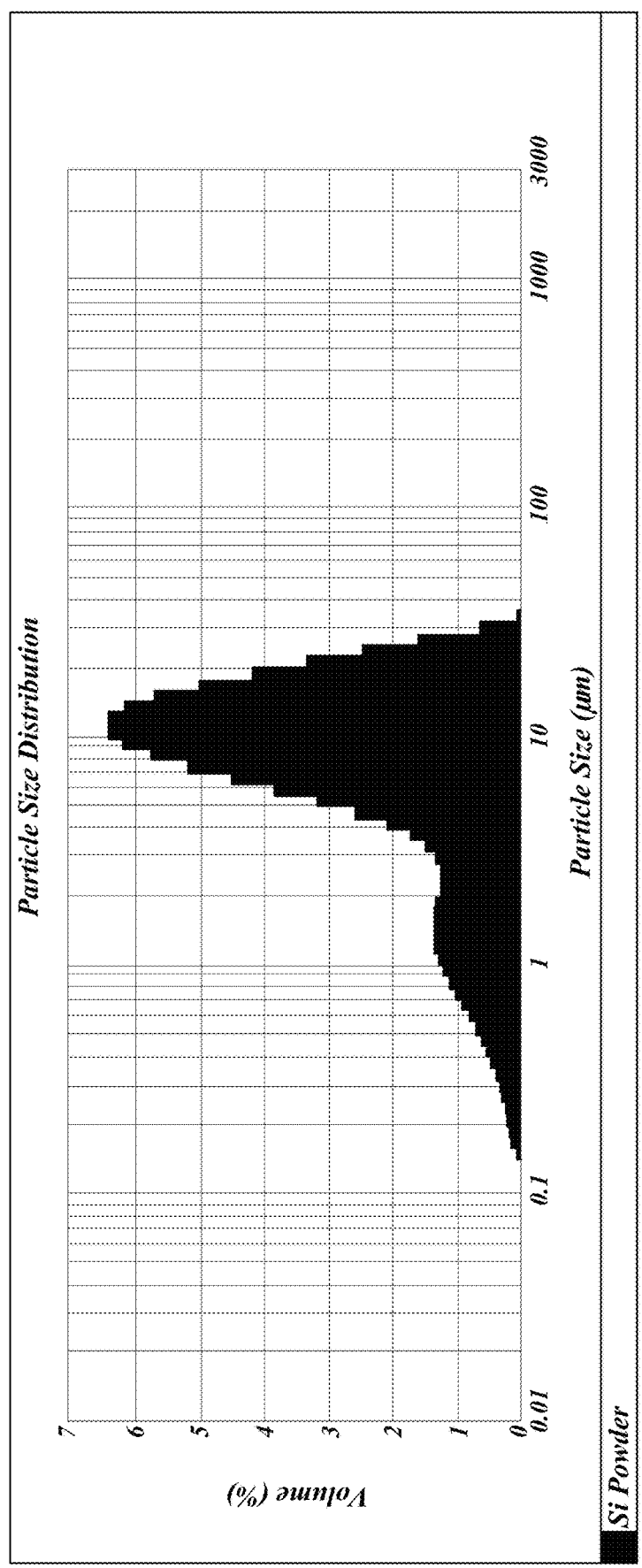
FIGS. 27A and 27B are example particle size histograms of two micron-sized silicon particles with nanometer-sized features.
Figure 27B:
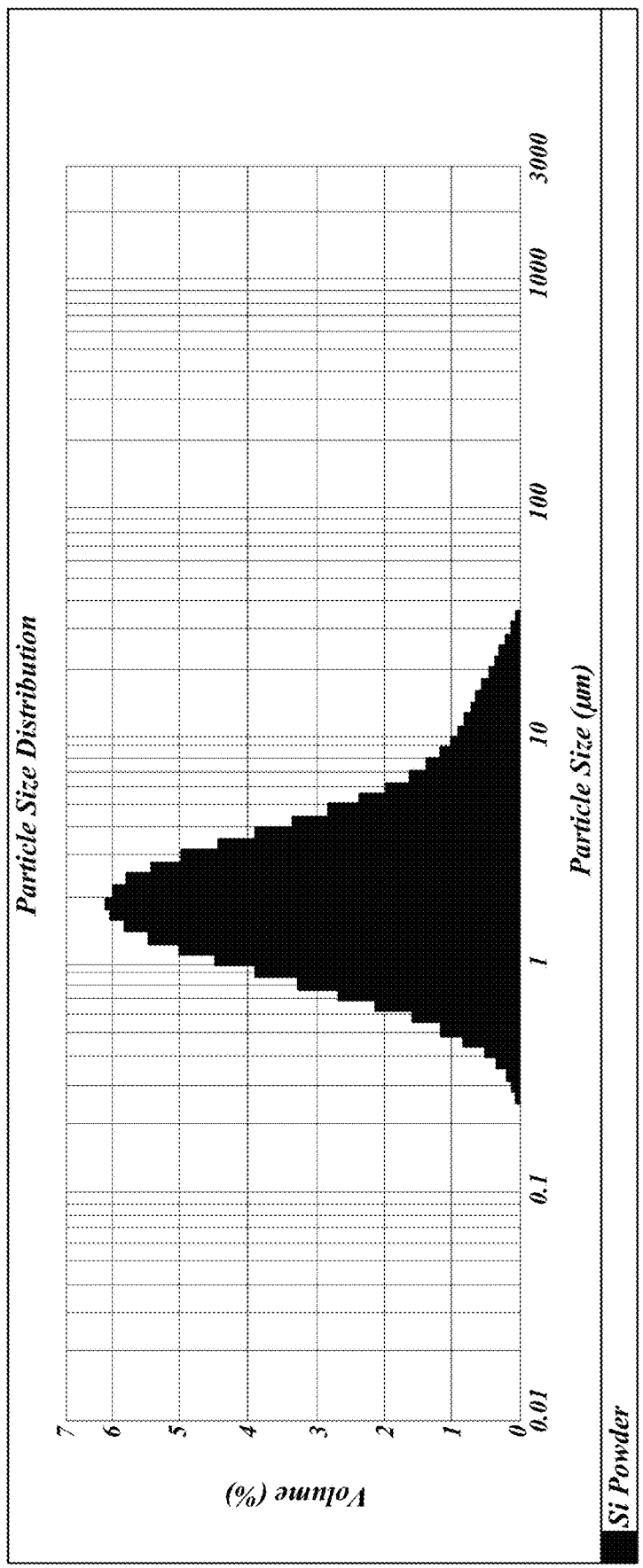

FIGS. 27A and 27B are example particle size histograms of two micron-sized silicon particles with nanometer-sized features. The particles were prepared from a FBR process. Example silicon particles can have a particle size distribution. For example, at least 90% of the particles may have a particle size, for example, a diameter or a largest dimension, between about 5 μm and about 20 μm (e.g., between about 6 μm and about 19 μm). At least about 50% of the particles may have a particle size between about 1 μm and about 10 μm (e.g., about 2 μm and about 9 μm). Furthermore, at least about 10% of the particles may have a particle size between about 0.5 μm and about 2 μm (e.g., about 0.9 μm and about 1.1 μm).

Figure 28:
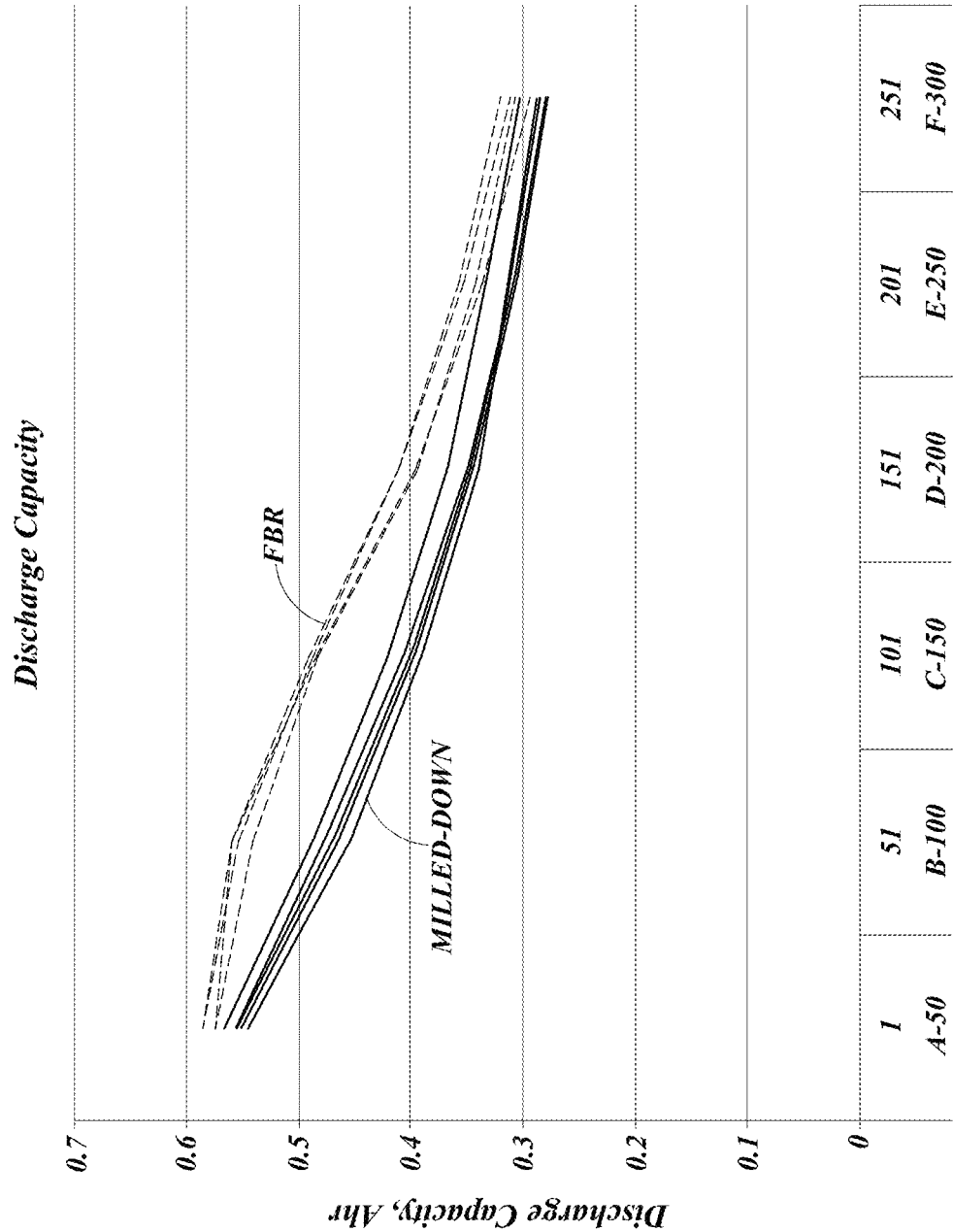
FIG. 28 is a plot of discharge capacity during cell cycling comparing two types of example silicon particles.

FIG. 28 is a plot of discharge capacity during cell cycling comparing two types of example silicon particles. The performance of four samples of silicon particles (micron-sized particles with nanometer-sized features) prepared by the FBR process are compared with five samples of silicon particles prepared by milling-down larger silicon particles. Thus, certain embodiments of silicon particles with the combined micron/nanometer geometry (e.g., prepared by the FBR process) can have enhanced performance over various other embodiments of silicon particles (e.g., micron-sized silicon particles prepared by milling down from larger particles). The type of silicon particles to use can be tailored for the intended or desired application and specifications.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming a composite material, the method comprising:
    providing a mixture comprising a precursor and silicon particles, wherein an average particle size of the silicon particles is greater than 0.5 μm; and
    pyrolysing the mixture to convert the precursor into one or more types of carbon phases to form the composite material,
    wherein at least one of the one or more types of carbon phases comprises a continuous phase that holds the composite material together such that the silicon particles are distributed throughout the composite material, and
    wherein the composite material comprises a material including silicon and carbon between the silicon particles and the one or more types of carbon phases.

2. The method of claim 1, wherein the material including silicon and carbon comprises silicon carbide.

3. The method of claim 1, wherein providing the mixture comprises providing a mixture comprising greater than 0% to about 90% by weight of the silicon particles, and about 5% to about 80% by weight of the precursor.

4. The method of claim 1, wherein providing the mixture comprises providing conductive particles in the mixture.

5. The method of claim 1, wherein providing the mixture comprises providing metal particles in the mixture.

6. The method of claim 1, wherein the silicon particles are homogeneously distributed throughout the composite material.

7. The method of claim 1, wherein the silicon particles are in contact with the continuous phase.

8. The method of claim 1, wherein the silicon particles have an average largest dimension of 1 μm to 40 μm.

9. The method of claim 1, wherein the continuous phase of the at least one of the one or more types of carbon phases is electrochemically active and electrically conductive.

10. The method of claim 1, wherein the one or more types of carbon phases comprises graphite particles.

11. The method of claim 1, wherein the composite material is electrochemically active.

12. The method of claim 1, wherein the composite material comprises the silicon particles at about 50% to about 90% by weight.

13. The method of claim 1, comprising
    casting the mixture on a substrate;
    drying the mixture;
    removing the dried mixture from the substrate; and
    placing the dried mixture in a hot press.

14. A method of forming a battery cell, the method comprising:
    forming an anode of the battery cell, the anode comprising a composite material, wherein:
        the composite material comprises one or more types of carbon phases and silicon particles;
        an average particle size of the silicon particles is greater than 0.5 μm;
        at least one of the one or more types of carbon phases comprises a continuous phase that holds the composite material together such that the silicon particles are distributed throughout the composite material, and
        the composite material comprises a material including silicon and carbon between the silicon particles and the one or more types of carbon phases; and
    separating the anode from a cathode of the battery cell with a separator and electrolyte of the battery cell.

15. The method of claim 14, wherein the forming the anode comprises pyrolysing a mixture comprising a precursor and the silicon particles to convert the precursor into the one or more types of carbon phases.

16. The method of claim 15, wherein the mixture comprises greater than 0% to about 90% by weight of the silicon particles, and about 5% to about 80% by weight of the precursor.

17. The method of claim 15, wherein the mixture comprises conductive particles.

18. The method of claim 15, wherein the mixture comprises metal particles.

19. The method of claim 15, wherein the forming of the anode comprises:
    casting the mixture on a substrate;
    drying the mixture;
    removing the dried mixture from the substrate; and
    placing the dried mixture in a hot press.

20. The method of claim 14, wherein the forming the anode homogeneously distributes the silicon particles throughout the composite material.

21. The method of claim 14, wherein the silicon particles are in contact with the continuous phase.

22. The method of claim 14, wherein the silicon particles have an average largest dimension of 1 μm to 40 μm.

23. The method of claim 14, wherein the composite material is electrochemically active.

24. The method of claim 14, wherein the composite material comprises the silicon particles at about 50% to about 90% by weight.

25. The method of claim 14, wherein the material including silicon and carbon comprises silicon carbide.

\* \* \* \* \*